United States Patent
Macready et al.

(10) Patent No.: US 7,844,656 B2
(45) Date of Patent: Nov. 30, 2010

(54) SYSTEMS, METHODS AND APPARATUS FOR FACTORING NUMBERS

(75) Inventors: William G. Macready, West Vancouver (CA); Johnny Jone Wai Kuan, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 1177 days.

(21) Appl. No.: 11/484,368

(22) Filed: Jul. 10, 2006

(65) Prior Publication Data

US 2007/0080341 A1    Apr. 12, 2007

Related U.S. Application Data

(60) Provisional application No. 60/698,362, filed on Jul. 11, 2005.

(51) Int. Cl.
    *G06G 7/00* (2006.01)
(52) U.S. Cl. .................................... 708/801
(58) Field of Classification Search .............. 708/3, 708/801
    See application file for complete search history.

(56) References Cited

U.S. PATENT DOCUMENTS

| | | | |
|---|---|---|---|
| 6,838,694 | B2 | 1/2005 | Esteve et al. |
| 2005/0082519 | A1 | 4/2005 | Amin et al. |
| 2005/0224784 | A1 | 10/2005 | Amin et al. |
| 2005/0250651 | A1 | 11/2005 | Amin et al. |
| 2005/0256007 | A1 | 11/2005 | Amin et al. |
| 2006/0147154 | A1 | 7/2006 | Thom et al. |

OTHER PUBLICATIONS

Averin, et al., "Variable Electrostatic Transformers," U.S. Appl. No. 11/100,931, filed Apr. 6, 2005.
Hilton et al., "Factoring on an Optimization Type Quantum Computer," U.S. Appl. No. 60/698,362, filed Jun. 6, 2005.
Agrawal, M. et al., "PRIMES is in P," URL=http://www.cse.iitk.ac.in/news/primality.html, Aug. 2002.
Burges, C., "Factoring as Optimization," *Microsoft Technical Report MSR-TR-2002-83*: Aug. 2002.
Cohen, H. et al., "Primality Testing and Jacobi Sums," *Mathematics of Computation* 42(165): 297-330, Jan. 1984.
Cormen, T. et al., *Introduction to Algorithms*, 2d ed., MIT Press, Cambridge, 2001, p. 887-896.
Eades, P. et al., "Algorithms for Drawing Graphs: An Annotated Bibliography," *Technical Report CS-89-09*, Revised Version, Oct. 1989.
Farhi, E. et al., "Quantum Adiabatic Evolution Algorithms versus Simulated Annealing," *arXiv:quant-ph/0201031* 1:1-16, Jan. 8, 2002.
Feynman, R., "Simulating Physics with Computers," *International Journal of Theoretical Physics* 21(6/7): 467-488, May 1982.

(Continued)

*Primary Examiner*—Tan V Mai
(74) *Attorney, Agent, or Firm*—Seed IP Law Group PLLC

(57) ABSTRACT

Systems, methods and apparatus for factoring numbers are provided. The factoring may be accomplished by creating a factor graph, mapping the factor graph onto an analog processor, initializing the analog processor to an initial state, evolving the analog processor to a final state, and receiving an output from the analog processor, the output comprising a set of factors of the number.

37 Claims, 14 Drawing Sheets

OTHER PUBLICATIONS

Gallop, J. C. et al., "SQUIDs and their applications," *Journal of Physics E: Scientific Instruments* 9:417-429, 1976.

Garey, M. et al., *Computers and Intractability: A Guide to the Theory of NP-Completeness*, W.H. Freeman and Company, New York, 1979, 1-15.

Jung, K. R. et al., "A rapid single flux quantum 1 bit arithmetic logic unit constructed with a half-adder cell," *Supercond. Sci. Technol.* 17:770-774, 2004.

Kleiner, R. et al., "Superconducting Quantum Interference Devices: State of the Art and Applications," *Proceedings of the IEEE* 92(10):1534-1548, Oct. 2004.

Lenstra, A., "Integer Factoring," *Designs, Codes and Cryptography* 19 (101-128):31-58, 2000.

Makhlin, Y. et al., "Quantum-state engineering with Josephson-junction devices," *Reviews of Modern Physics* 73(2):357-400, Apr. 2001.

Mehlhorn, K., "LEDA: A Platform for Combinatorial and Geometric Computing," *Communications of the ACM*, 38(1):96-102, Jan. 1995.

Nielsen, M. et al., *Quantum Computation and Quantum Information*, Cambridge University Press, Cambridge, 2000, p. 343-345.

Shor, P., "Introduction to Quantum Algorithms," *arXiv:quant-ph/0005003* 2:1-17, Jul. 6, 2001.

Shor, P., "Polynomial-Time Algorithms for Prime Factorization and Discrete Logarithms on a Quantum Computer," *SIAM J. Comput.* 26(5):1484-1509, Oct. 1997.

Vandersypen, L. et al., "Experimental realization of Shor's quantum factoring algorithm using nuclear magnetic resonance," *Nature* 414(20):883-887, Dec. 27, 2001.

|     |        |        |        | ← 310 |
| --- | ------ | ------ | ------ | ----- |
|     | 1      | $y_3$  | $y_2$  | $y_1$ | 1   ← 314 |
|     |        |        |        |       |

$$\begin{array}{ccccc} & 1 & y_3 & y_2 & y_1 & 1 \\ \times & & & & & x \\ \hline x & y_3x & y_2x & y_1x & x \\ y_3 & y_2 & y_1 & 1 \\ \hline 1 & 1 & 1 & 0 & 1 & 1 \end{array}$$

$$
\begin{aligned}
y_1 + x &= 1 & (1)\\
y_2 + y_1 x + 1 &= 1 + 2z_1 & (2)\\
y_3 + y_2 x + y_1 + z_1 &= 0 + 2z_2 + 4z_3 & (3)\\
1 + y_3 x + y_2 + z_2 &= 1 + 2z_4 & (4)\\
x + y_3 + z_3 + z_4 &= 1 + 2z_5 & (5)\\
1 + z_5 &= 1 & (6)
\end{aligned}
$$

416:

$$
\begin{aligned}
y_1 + x &= 1 & (1)\\
y_2 + 1 &= 1 & (2)\\
y_3 + y_2 x + y_1 &= 0 + 2z_2 + 4z_3 & (3)\\
1 + y_3 x + y_2 + z_2 &= 1 + 2z_4 & (4)\\
x + y_3 + z_3 + z_4 &= 1 & (5)\\
1 &= 1 & (6)
\end{aligned}
$$

419:

$$
\begin{aligned}
y_1 + x &= 1 & (1)\\
1 &= 1 & (2)\\
y_3 + y_1 &= 0 + 2z_2 & (3)\\
1 + y_3 x + y_2 + z_2 &= 1 + 2z_4 & (4)\\
x + y_3 + z_4 &= 1 & (5)\\
1 &= 1 & (6)
\end{aligned}
$$

422:

$$
\begin{aligned}
(y_1 + x - 1)^2 &= 0 & (1)\\
0 &= 0 & (2)\\
(y_3 + y_1 - 2z_2)^2 &= 0 & (3)\\
(w + z_2 - 2z_4)^2 &= 0 & (4)\\
(x + y_3 + z_4 - 1)^2 &= 0 & (5)\\
0 &= 0 & (6)
\end{aligned}
$$

FIG. 4

$$E = \mu_1(y_1 + x - 1)^2 + \mu_2(y_3 + y_1 - 2z_2)^2 + \mu_3(w + z_2 - 2z_4)^2 + \mu_4(x + y_3 + z_4 - 1)^2 +$$
$$\lambda_1(w - y_3 + s_1)^2 + \lambda_2(w - x + s_2)^2 + \lambda_3(y_3 + x - w + s_3 - 1)^2$$

← 501

$$Q = \frac{1}{2} \begin{bmatrix} 0 & \mu_2 & \mu_1 & 0 & 0 & 0 & 0 & 0 & 0 \\ \mu_2 & 0 & \lambda_3+\mu_4 & -\lambda_1-\lambda_3 & 0 & -2\mu_2 & 0 & 0 & 0 \\ \mu_1 & \lambda_3+\mu_4 & 0 & -\lambda_2-\lambda_3 & -2\mu_2 & 0 & 0 & 0 & 0 \\ 0 & -\lambda_1-\lambda_3 & -\lambda_2-\lambda_3 & 0 & \mu_3 & 0 & -\lambda_1 & \lambda_2 & -\lambda_3 \\ -2\mu_2 & 0 & -2\mu_2 & \mu_3 & 0 & -2\mu_3 & 0 & 0 & 0 \\ 0 & -2\mu_2 & 0 & 0 & -2\mu_3 & \mu_4 & 0 & 0 & 0 \\ 0 & 0 & 0 & -\lambda_1 & 0 & 0 & \lambda_1 & 0 & 0 \\ 0 & 0 & 0 & \lambda_2 & 0 & 0 & 0 & \lambda_2 & 0 \\ 0 & 0 & 0 & -\lambda_3 & 0 & 0 & 0 & 0 & -\lambda_3 \end{bmatrix} - \mathbf{r} = \begin{bmatrix} \mu_1 - \mu_2 \\ \mu_2 - \mu_4 + \lambda_1 - \lambda_3 \\ -\mu_1 - \mu_4 + \lambda_2 - \lambda_3 \\ \mu_3 + \lambda_1 + \lambda_2 + 3\lambda_3 \\ 4\mu_2 + \mu_3 \\ 4\mu_3 - \mu_4 \\ \lambda_1 \\ \lambda_2 \\ -\lambda_3 \end{bmatrix} = \mathbf{x} \begin{bmatrix} y_1 \\ y_3 \\ x \\ w \\ z_2 \\ z_4 \\ s_1 \\ s_2 \\ s_3 \end{bmatrix}$$

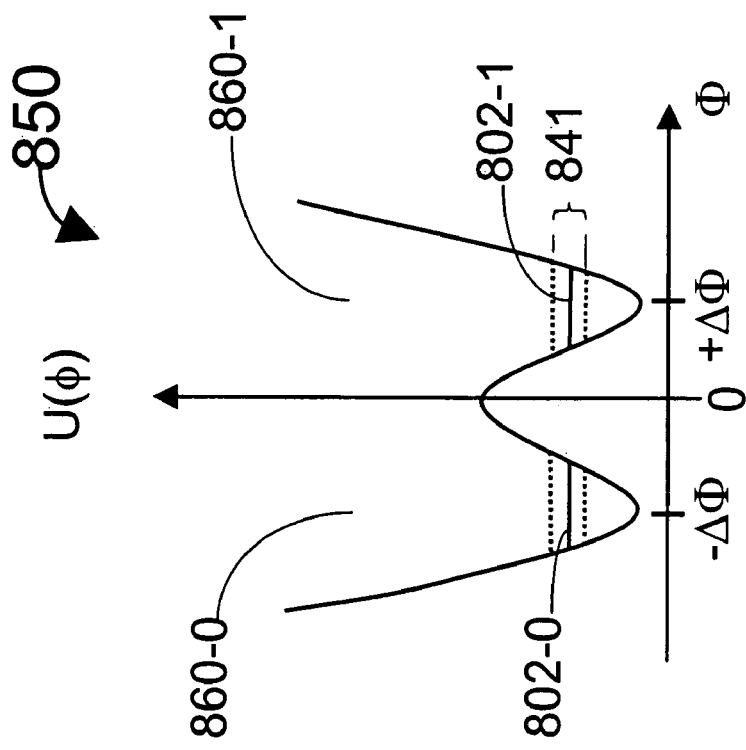
FIG. 8B (Prior Art)
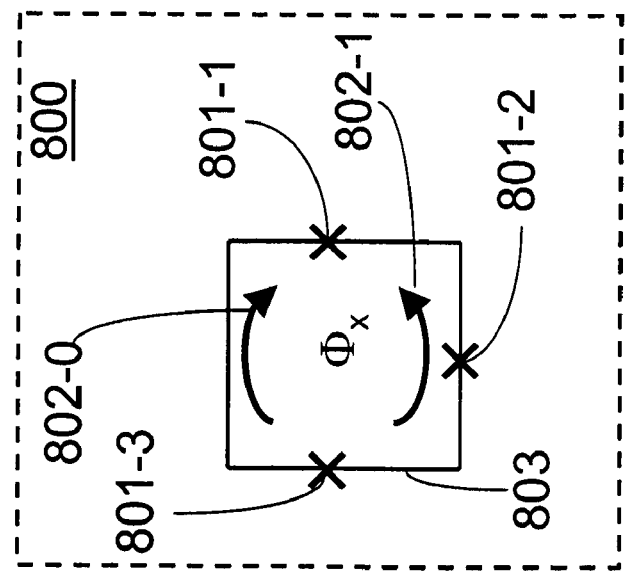
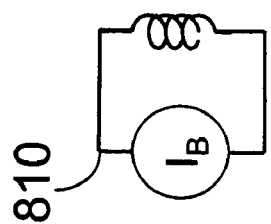
FIG. 8A (Prior Art)

SYSTEMS, METHODS AND APPARATUS FOR FACTORING NUMBERS

RELATED APPLICATION

This application claims benefit, under 35 U.S.C. §119(e), of U.S. Provisional Patent Application No. 60/698,362, filed Jul. 11, 2005, which is incorporated herein, by reference, in its entirety.

FIELD OF THE INVENTION

The present methods, system and apparatus relate to the factoring of numbers using an analog processor.

BACKGROUND

Factoring large integer numbers is a difficult mathematical problem. The problem of integer factorization can be formulated as: given a positive integer, find all the prime factors of the integer. Every positive integer has a unique prime factorization. For small numbers, such as 16, factoring is quite simple. However, as the number increases, in general, finding the factors becomes increasingly difficult. In fact, the problem becomes intractable on known computing devices for large numbers. Conversely, however, confirming that a set of primes is the prime factorization of a number is easy.

One particular set of integers that is interesting to factor are biprimes. Biprimes are integers that are the direct product of two, not necessarily distinct, prime factors. For example, 15 is a biprime since 3 and 5 are the only prime factors and it can be derived by multiplying them together. The factoring of biprimes is of interest in the fields of cryptography and cryptanalysis, among other fields. Some cryptography schemes use the difficulty of factoring large biprimes as the basis for their encryption system. For example, a large biprime is used to encrypt data such that decryption of the data is only possible through the identification of the prime factors of the biprime. Such an encryption scheme is not absolutely secure because it is possible to identify prime factors, albeit through considerable effort. Thus, security of data encrypted in such a manner is only ensured for the period of time that it would take a third party to identify the prime factors for the biprime used to encrypt the data. Thus, such encryption schemes are useful when the amount of time it would take an unauthorized third party to find the prime factors of the encryption is much longer than the amount of time the information would be useful.

Complexity Classes

Complexity theory is the quantitative study of the time it takes for a computer to solve a decision problem and the resources required to solve the decision problem. In logic, a decision problem is determining whether or not there exists a decision procedure or algorithm for a class S of questions requiring a Boolean value (i.e., a true or false, or yes or no). These are also known as yes-or-no questions. Such problems are assigned to complexity classes, the number and type of which is ever changing, as new complexity classes are defined and existing ones merge through the contributions of computer scientists. One exemplary complexity class involves those decision problems that are solvable in polynomial time by a Turing machine (P, herein poly). Another exemplary complexity class involves those decision problems that are solvable in non-deterministic polynomial-time, or problems whose solution is verifiable in polynomial time (NP). Still another complexity class is NP-hard (non-deterministic polynomial-time hard; NPH), which includes decision problems that have been shown to be hard to solve. More specifically, NP-hard refers to the class of decision problems that contains all problems H such that for every decision problem L in NP there exists a polynomial-time many-one reduction to H, written $L \leq H$. Informally, this class can be described as containing the decision problems that are at least as hard as any problem in NP. A decision problem is NP-Complete (NPC) if it is in NP and it is NP-hard.

A problem is equivalent, or harder to solve, than a known problem in NPC if there exists a polynomial time reduction to the instant problem from the known problem in NPC. Reduction can be regarded as a generalization of mapping. The mappings can be a one-to-one function, a many-to-one function, making use of an oracle, etc. The concept of complexity classes and how they define the intractability of certain decision problems is found in, for example, M. R. Garey, D. S. Johnson, 1979, *Computers and Intractability: A Guide to the Theory of NP-Completeness*, Freeman, San Francisco, ISBN: 0716710455, pp. 1-15.

It is not exactly known which complexity classes the integer factorization problem falls under. It is widely believed to be outside P, since there have been many attempts to find a polynomial-time solution but none have worked. It is also suspected to be outside NPC. The integer factorization problem, expressed as a decision problem, where it suffices to answer whether an integer N has a factor less than M, is a known NP problem. Also, the determination of whether an integer is prime, expressed as a decision problem, is a known P problem. In the field of quantum computing, Shor's algorithm for factoring numbers (discussed below) proved that factoring biprimes is in the bounded-error, quantum, polynomial (BQP) complexity class. This means it can be solved by a quantum computer in polynomial time with an error probability of at most 0.25 for all instances.

Quantum Computers

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

An analog processor is a processor that employs the fundamental properties of a physical system to find the solution to a computation problem. In contrast to a digital processor, which requires an algorithm for finding the solution followed by the execution of each step in the algorithm according to Boolean methods, analog processors do not involve Boolean methods.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers" International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms" arXiv.org:quant-ph/0005003 (2001), pp. 1-27. The art is still hampered by an inability to increase the coherence of qubits to acceptable levels for designing and operating practical circuit model quantum computers.

Another approach to quantum computation, called thermally-assisted adiabatic quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, and quantum annealing, and are described, for example, in Farhi, E. et al., "Quantum Adiabatic Evolution Algorithms versus Simulated Annealing" arXiv.org:quant-ph/0201031 (2002), pp 1-16.

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle=a|0\rangle+b|1\rangle$, where a and b are coefficients corresponding to the probabilities $|a|^2$ and $|b|^2$, respectively. The coefficients a and b each have real and imaginary components. The quantum nature of a qubit is largely derived from its ability to exist in a coherent superposition of basis states. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regains its similarity to a conventional bit. The actual state of the qubit after it has collapsed depends on the probabilities $|a|^2$ and $|b|^2$ immediately prior to the readout operation.

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference is superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519, where are hereby incorporated by reference in their entireties.

Classical Factoring Algorithms

There are many known classical algorithms that exist for computing the prime factorization of integers. These classical algorithms fall into two main categories: special-purpose algorithms and general purpose algorithms. The efficiency of special purpose algorithms is number dependent. That is, depending on the properties of the number, the time it takes for the special-purpose algorithm to find the factors greatly varies. If the algorithm gets "lucky" and gets a number that works well with it, the solution can be found fairly quickly. For some numbers, special purpose algorithms can fail to find a solution.

In contrast to special purpose algorithms, general purpose algorithms are almost guaranteed to work for any number. The run-time of general purpose algorithms depends solely on the size of the number being factored. For more information, see Lenstra, 2000, *Designs, Codes, and Cryptography* 19, 101-128.

Some examples of special purpose algorithms include Pollard's rho algorithm, William's p+1 algorithm, and Fermat's factorization method. Examples of general purpose algorithms include Dixon's algorithm, quadratic sieve, and general number field sieve. See Lenstra for more information about how factorization algorithms work. For very large numbers, general purpose algorithms are preferred. Currently, the largest RSA challenge biprime to be factored is a 200 digit number. The general number field sieve method was used to solve this number.

Known classical algorithms for prime factorization require substantial amounts of computational power. For example such problems typically require powerful computing architectures such as supercomputers, massively parallel computing systems, and distributed computing systems that operate over a network such as the Internet. Even with such powerful computing architectures, the run time of the algorithms is very long. For example, the 200 digit number took approximately 1.5 years to factor with a cluster of 80 computers operating at a clock speed of 2.2 GHz. For larger biprimes such as those used in encryption, which can be 300 digits or more, the calculation would require prohibitively large computational power and very long run times.

Quantum Factoring Algorithms

In 1994, Peter Shor developed an algorithm for factoring integers that is intended to be run on a quantum computer. Using the special properties of quantum computers, the algorithm is able to probabilistically factor in $O((\log N)^3)$ time using $O(\log N)$ space, where space refers to the amount of computational memory needed and where N is the number to be factored. This polynomial run time was a significant improvement over the best classical algorithms, which ran in sub-exponential time. See Shor, 1997, *SIAM J. Comput.* 26, pp. 1484-1509. Recently, a group from IGM experimentally realized Shor's Algorithm by factoring the number fifteen using a rudimentary 7-qubit nuclear magnetic resonance (NMR) quantum computer. The group used circuit model quantum computing to implement their algorithm. See Vandersypen et al., 2001, *Nature* 414, 883. However, the Vandersypen et al. method utilized a priori knowledge of the answers. In addition, NMR computers, such as those used by Vandersypen et al. are not scalable, meaning that larger, more interesting numbers cannot be factored using the methods taught by Vandersypen et al.

A classical model of factoring, expressed as an optimization problem, is disclosed in Burges, 2002, Microsoft Technical Report MSR-TR-2002-83. That is, the method of Burges is different from other proposed algorithms because it attempts to map the prime factorization problem to an optimization problem rather than a decision problem. Optimization problems are a class of problems where the aim is the maximize or minimize one or more variables of the problem. In the case of Burges, the biprime and its factors are represented in bit form, with the factor bits being variables. Then, by using long multiplication of the factors to get the biprime, one can derive a set of factor equations. The factor equations are then reduced as much as possible and then cast into an optimization of coefficients in a single equation. The solution of the optimization problem should give the proper bit values of the factors, thus effectively factoring the biprime.

However, the drawback of the Burges algorithm is that it is limited to use on a classical computer. Optimization problems, though a different type of problem than prime factorization, can also take up a tremendous amount of computing power. Thus, the obstacle of sufficient resources still has not been solved.

Accordingly, there remains a need in the art for improved methods for prime factorization of large numbers.

BRIEF DESCRIPTION OF THE DRAWINGS

FIG. 3 is a schematic diagram illustrating an embodiment of long bit-wise multiplication of two numbers.

FIG. 4 is a schematic diagram illustrating an embodiment of row reduction of a set of factor equations.

FIG. 5 is a schematic diagram illustrating an embodiment of an energy function and corresponding matrices.

FIGS. 8A and 8B are schematic diagrams showing an existing quantum device and associated energy landscape, respectively.

Figure 1:
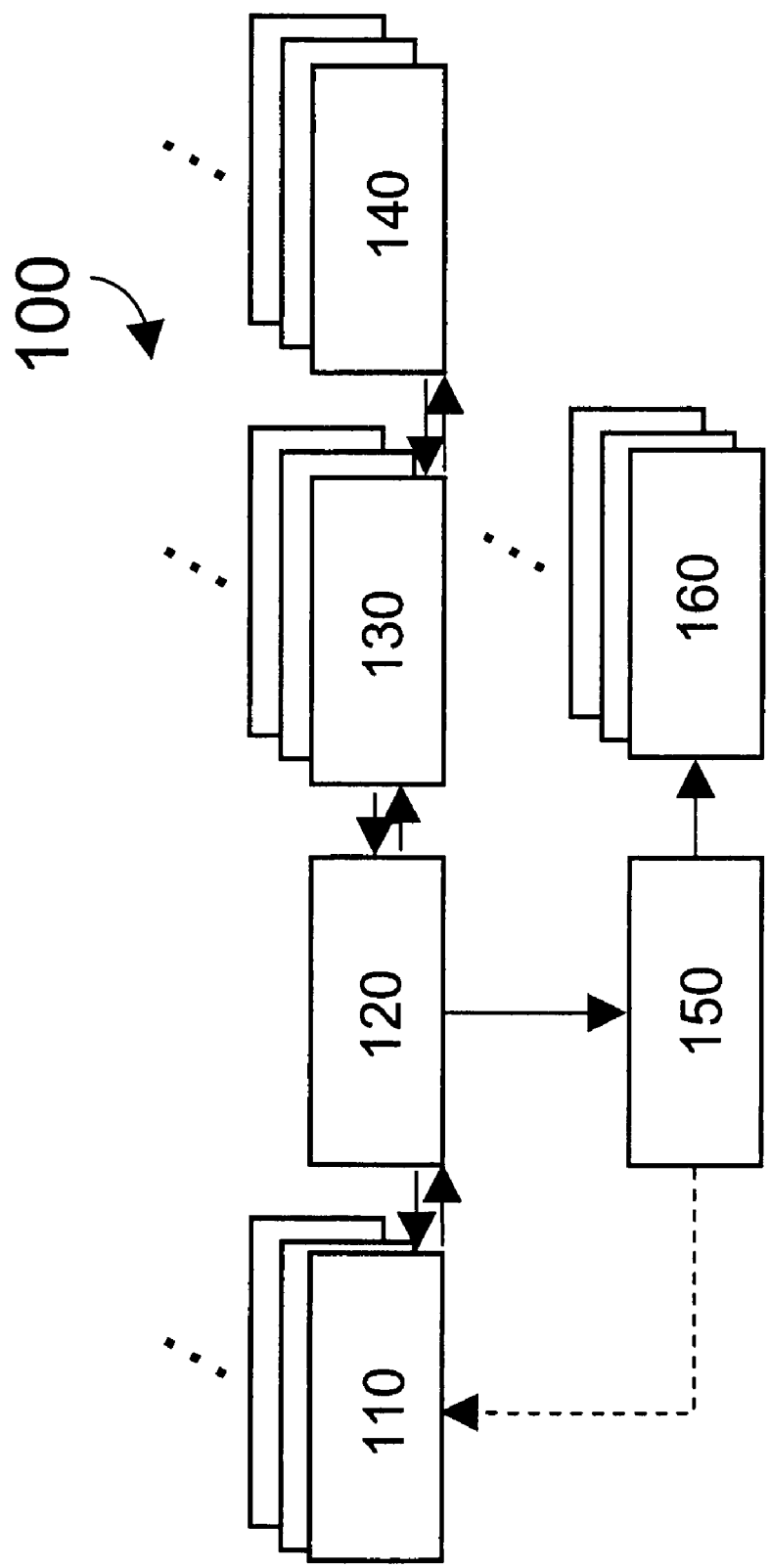
FIG. 1 is a schematic diagram showing an operational flow of a factoring device in accordance with an aspect of the present systems, methods and apparatus.

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements and have been solely selected for ease of recognition in the figures. Furthermore, while the figures may show specific layouts, one skilled in the art will appreciate that variations in design, layout, and fabrication are possible and the shown layouts are not to be construed as limiting the layout of the present systems, methods and apparatus.

SUMMARY OF THE INVENTION

In one embodiment, a method of factoring a number includes creating a factor graph; mapping the factor graph onto an analog processor; initializing the analog processor to an initial state; evolving the analog processor from the initial state to a final state; and receiving an output from the analog processor, the output comprising a set of factors of the number.

In one embodiment, a method of factoring a number includes constructing a set of possible factor bit length combinations for the number; deriving a set of factor equations for each factor bit length combination; converting a selected set of factor equations into a factor graph; embedding the factor graph onto an analog processor; evolving the analog processor from an initial state to a final state; measuring the final state of the analog processor; and constructing a set of factors of the number based on the final state of the analog processor.

In one embodiment, a computer program product for use with a computer system for factoring a number comprises a computer readable storage medium and a computer program mechanism embedded therein, the computer program mechanism includes instructions for creating a factor graph; instructions for mapping the factor graph onto an analog processor; instructions for initializing the analog processor to an initial state; instructions for evolving the analog processor from the initial state to a final state; and instructions for receiving an output from the analog processor, the output comprising a set of factors of the number.

In one embodiment, a computer system for factoring a number includes a central processing unit; and a memory, coupled to the central processing unit, the memory storing at least one program module, the at least one program module encoding: instructions for creating a factor graph; instructions for mapping the factor graph onto an analog processor; instructions for initializing the analog processor to an initial state; instructions for evolving the analog processor from the initial state to a final state; and instructions for receiving an output from the analog processor, the output comprising a set of factors of the number.

In one embodiment, a computer program product for use with a computer system for factoring a number comprises a computer readable storage medium and a computer program mechanism embedded therein, the computer program mechanism includes instructions for constructing a plurality of possible factor bit length combinations for the number; instructions for deriving a set of factor equations for each factor bit length combination; instructions for converting a selected set of factor equations into a factor graph; instructions for embedding the factor graph as input to an analog processor; instructions for evolving the analog processor from an initial state to a final state; instructions for receiving the final state of the analog processor; and instructions for constructing a set of factors of the number based on the final state of the analog processor.

In one embodiment, a data signal embodied on a carrier wave, comprises a set of factors of a number, the set of factors obtained according to a method includes creating a factor graph; mapping the factor graph onto an analog processor; initializing the analog processor to an initial state; evolving the analog processor from the initial state to a final state; and receiving an output from the analog processor, the output comprising the set of factors.

In one embodiment, a system for factoring a number includes an analog processor; a graph module for creating a factor graph; a mapper module for mapping the factor graph onto the analog processor; an initialization module for initializing the analog processor to an initial state; an evolution module for evolving the analog processor from the initial state to a final state; and a receiver module for receiving an output from the analog processor, the output comprising a set of factors of the number.

In one embodiment, a graphical user interface for depicting a set of factors of a number comprises a first display field for displaying the set of factors, the set of factors obtained by a method includes creating a factor graph; mapping the factor graph onto an analog processor; initializing the analog processor to an initial state; evolving the analog processor from the initial state to a final state; and receiving an output from the analog processor, the output comprising the set of factors.

In one embodiment, a method of factoring a product includes setting an initial condition of a multiplication circuit, wherein: the multiplication circuit includes a plurality of quantum devices arranged in a two-dimensional grid; and a plurality of coupling devices between pairs of quantum devices; and the initial condition includes: a local bias value for at least one quantum device; a coupling value for at least one coupling device; and a binary value of the product to be factored; performing a backwards evolution of the multiplication circuit; and reading out a final state of at least one of the quantum device, thereby determining a factor of the product.

In one embodiment, a computer system for factoring a product includes a central processing unit; a multiplication circuit in communication with the multiplication circuit, the multiplication circuit comprising a plurality of bitwise multipliers, each bitwise multiplier including: a plurality of quantum devices; a plurality of coupling devices, each of the coupling devices coupling a pair of the quantum devices; a plurality of inputs; a plurality of outputs; and a memory coupled to the central processing unit, the memory storing at least one program module encoding: instructions for setting an initial condition of the multiplication circuit, the initial condition including: a local bias value for at least one of the quantum devices; a coupling values for at least one coupling devices; and a binary value of the product to be factored; instructions for performing a backwards evolution of the multiplication circuit; and instructions for reading out a final state of at least one of the quantum devices, thereby determining a factor of the product.

In one embodiment, a method includes converting a factoring problem into an optimization problem; mapping the optimization problem onto an analog processor; initializing the analog processor to an initial state; evolving the analog processor from the initial state to a final state, the final state representing a solution to the optimization problem; and determining a solution to the factoring problem from the solution to the optimization problem.

DETAILED DESCRIPTION

FIG. 1 illustrates the relationship between entities according to one embodiment of the present systems, methods and apparatus. A system 100 includes an input queue 110 holding an ordered list of numbers to be factored. A preprocessor 120 obtains a target number from input queue 110, and processes it. Depending on the value of the target number, the preprocessor 120 may discard the number or create a set of factor equations and corresponding factor graphs. Such factor graphs are held in a queue 130 and they are supplied as input to a computing device 140 (for example, an analog processor including a number of quantum devices). The result returned by the computing device is sent to preprocessor 120 which, in turn, passes such results to a checker 150. The checker 50 verifies that the factors obtained are factors of the target number and that they are prime. If a factor is not prime, the checker 150 adds the factor to the input queue 110. If a factor is prime, it is placed in results in the queue 160.

To test for primality (that is, whether a factor is prime), a classical algorithm may be used. For example, there are several known approximate primality algorithms, all of which run in polynomial time, which can determine without 100% certainty if a number is prime. There is also an exact classical algorithm that can determine primality with 100% certainty, and it is believed to run in polynomial time. The density of primes of length n is approximately n log(n). Randomized polynomial time algorithms for determining if a number is prime include the Miller-Rabin primality test. Approximate primality tests include inverted Fermat's little theorem tests: if $2^{n-1}=1$ mod n then, with high probability, n is prime. Deterministic algorithms for determining primality include the Cohen-Lenstra test and the Agrawal-Kayal-Saxena test. The Agrawal-Kayal-Saxena test is exact and runs in $O((\log (n))^{12})$. See, for example, Cormen et al., 1990, *Introduction to Algorithms*, MIT Press, Cambridge, pp. 801-852; Cohen and Lenstra, 1984, "Primality testing and jacobi sums," *Mathematics of Computation* 42(165), pp. 297-330; Agrawal et al., 2002, "PRIMES is in P," manuscript available from the Indian Institute of Technology, http://www.cse.iitk.ac.in/news/primality.html.

Figure 2:
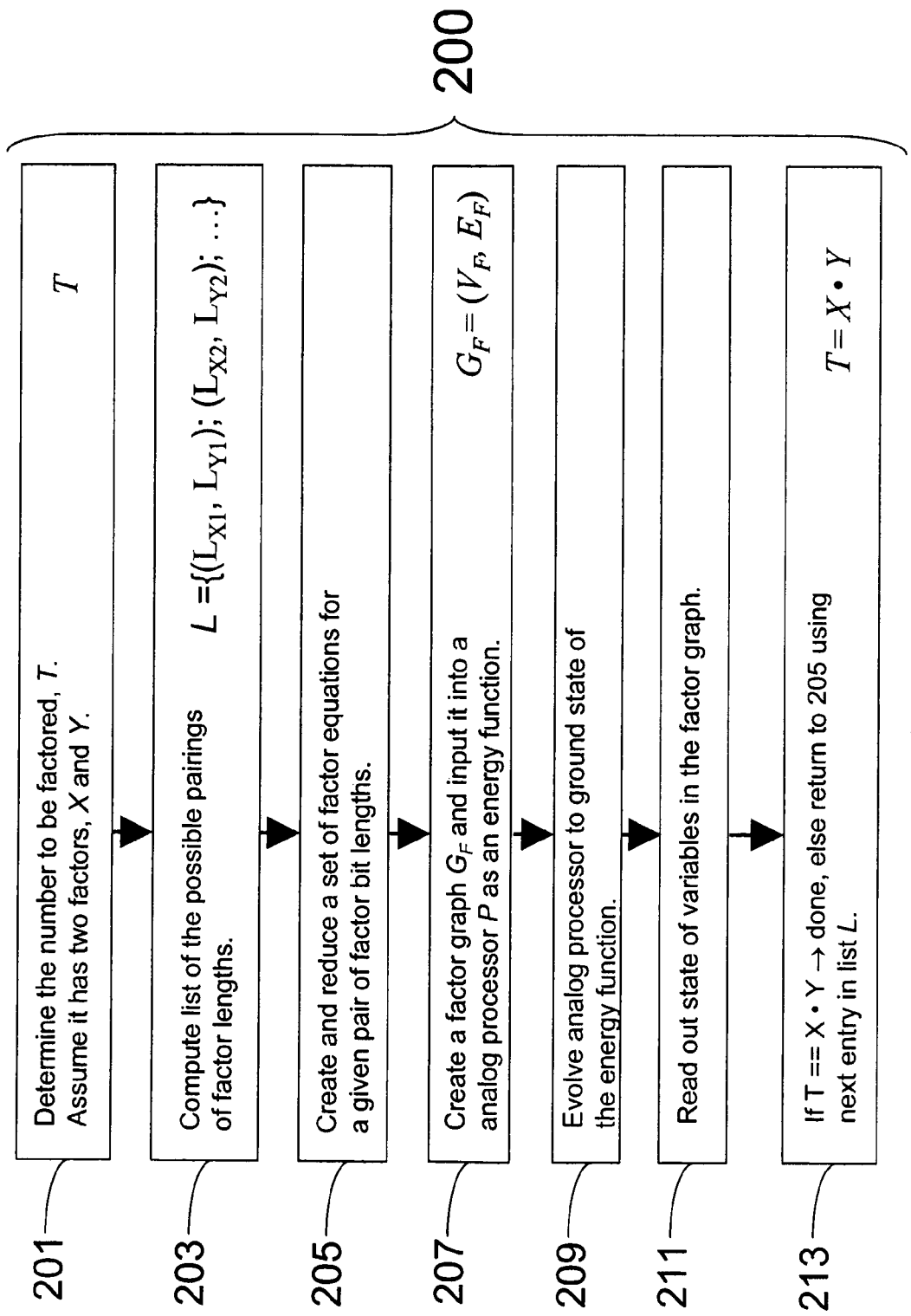
FIG. 2 is a flow diagram showing a series of acts for defining and computing the solution to a set of equations in accordance with an aspect of the present systems, methods and apparatus.

FIG. 2 illustrates a process 200 for determining the prime factors of an integer in accordance with an aspect of the present systems, methods and apparatus.

At 201, a number to be factored, T, is chosen, by e.g. drawing a number from input queue 110 (FIG. 1). As illustrated in FIG. 2, it is assumed that T is a biprime (that is, having only two prime factors, X and Y). Typically, at this point, the identity of the two prime factors, X and Y, is not known. While in FIG. 2 it is assumed that T is a biprime, those of skill in the art will appreciate that T may alternatively be a general composite number (i.e. has more than two prime factors), and process 200 may be used to factor T by, for example, not assuming the numbers are even, or by recasting the problem by removing a factor of $2^n$, where n>0. The process may be recursively applied to the factors obtained. Pre-processing to remove small prime factors may also be employed. Primality testing may be used to determine if recursion is needed. Alternatively, a set of factor equations may be created assuming that there are three or more factors, and bitwise multiplication employed, which is detailed elsewhere.

To further illustrate an embodiment of the present systems, methods and apparatus, the number 119 will be factored using the process described in reference to FIG. 2. 119 is large enough to not be immediately factorable by inspection, but is small enough to readily show the details of the present systems, methods and apparatus. First, the number to be factored is represented in binary form as 1110111, which is $L_T=7$ bits long. The factors, typically unknown at the outset of the computation, are labeled X and Y. It is assumed that the number to be factored is not prime. However, there are classical methods of checking whether or not a number is prime, that can be used to test the number before the factoring process begins.

At 203, the list of possible factor bit lengths L (the number of bits required to represent a number) for T is constructed. This means that, for a given T having bit length $L_T$, where it is assumed that the leading bit of T is 1, a set of bit length combinations ($L_X$, $L_Y$) is created, where each $L_X$ is the bit length of a corresponding X, each $L_Y$ is the bit length of a corresponding Y, and, for each bit length combination ($L_X$, $L_Y$), the following conditions apply: $1<L_X<L_T$; and $1<L_Y<L_T$. The bit lengths of factors sum to the bit length of the product or the bit length of the product plus one. In some cases, it may be assumed that Y is the larger factor, such that $L_X \leq L_Y$, in order to avoid double-counting. For example it may be desirable to avoid considering both (3, 4) and (4, 3), which in actuality represent the same combination of bit lengths. The set of bit length combinations may be ordered such that the combinations most likely to be the factors are tested first.

The set of bit length combinations ($L_X$, $L_Y$) for the factors X and Y of the number 119 may be constructed by taking combinations of bit lengths from 2 to $L_T$. The set does not include permutations of bit lengths, like (2, 3) and (3, 2), since they are the same. In this example, the entire set of bit lengths is {(2, 2), (2, 3), (2, 4), (2, 5), (2, 6), (2, 7), (3, 3), (3, 4), (3, 5), (3, 6), (3, 7), (4, 4), (4, 5), (4, 6), (4, 7), (5, 5), (5, 6), (5, 7), (6, 6), (6, 7), (7, 7)}. Bit lengths of one are not considered since a single bit can only encode 0 and 1. It is assumed that the most significant and least significant bits are 1. The first way of reducing the set of bit length pairs is to eliminate all pairs that, when multiplied, cannot give an answer that is 7 bits long (with a leading 1). This can easily be done on a classical computer. After this is done, the set of bit lengths is reduced to {(2, 5), (2, 6), (3, 4), (3, 5), (4, 4)}. One or more pairs from this set can contain the factors, if T is composite. If T is biprime, then only one pair of bit lengths can contain the factors. If T is prime, then no pairs will contain the factors.

In some cases, the entire set of bit lengths may not be constructed. Instead, a set of bit lengths is constructed initially by taking all pairs of bit lengths that add up to $L_T$ or $L_T+1$. For the number 119, one such pair is (2, 5). Any pair of bit lengths that cannot fulfill this condition cannot produce a number that is $L_T$ bits long. Using this method for 119, the same reduced set of bit lengths listed above is produced.

At 205, a set of factor equations is derived for one or more combinations of bit lengths ($L_X$, $L_Y$) generated, with T being represented by its bit string. The X and Y bit strings are represented as $(1, x_{L_{X-2}}, \ldots, x_1, 1)$ and $(1, y_{L_{Y-2}}, \ldots, y_1, 1)$ respectively. Then, the bit-wise long multiplication of the factors is written out, creating a set of binary equations for each bit position. The carries are represented as $z_i$, where i denotes the $i^{th}$ carry. For example, T could be the number 213, having the bit string (1, 1, 0, 1, 0, 1, 0, 1). The bit string for the unknown factors would be $(1, x_3, x_2, x_1, 1)$ and $(1, y_2, y_1, 1)$, where the variables are bits. An example of bit-wise multiplication of factors is shown in FIG. 3.

In some cases, it may be desirable to reduce the set of factor equations. For instance, the factor equations may be reduced by eliminating variables that are redundant or have obvious assignments. The reduction can take many forms including, but not limited to, row reduction over binary numbers, row reduction over the positive integers, row reduction over the integers, row reduction over real numbers, etc., as detailed below.

In other cases, it may be desirable to detect inconsistent factor equations. An example of inconsistent factor equations is provided in the example below in which the number 119 is factored into two prime numbers. If, while reducing the equations, or in a separate process, an inconsistency appears, the bit length combination is then determined to not provide a viable solution. The calculation stops and moves on to the next bit length combination. This proceeds until the set of bit length combinations is shortened to only include those combinations that could produce the bit length of T when multiplied. A method for detecting inconsistency includes reducing factor equations until an inconsistent equation or set of equations in a set of factor equations is identified, e.g., 0=1, or $x_1=0$ and $x_1=1$.

Where row reduction is used to identify inconsistent sets of factor equations, the complexity of each form of row reduction (over binary numbers, positive integers, integers and real numbers) decreases. Binary numbers are a subset of positive integers which, in turn, are a subset of the integers which, in turn, are a subset of the real numbers. If a set of equations does not have a solution over the real numbers, it will not have a solution over the binary numbers. Likewise for integers and positive integers. Therefore, sets of equations not having a solution over the binary numbers may be identified by row reduction over a superset of numbers, e.g., positive integers, integers and real numbers. This test can be generalized.

The degree of reduction may vary, and in some cases, the amount of reduction performed is monitored closely, since if reduction proceeds for too long the benefits of the reduction may be lost. On the other hand, if the reduction is terminated early, the size of the resulting problem may be unwieldy. Those of skill in the art will appreciate that it may be desirable to trade off between the benefits of factor reduction and the length of time required for such factor reduction.

In one simplification method, a series of reduction rules is applied to each equation, independent of the rest of the system, to try and determine the values of some of the variables. For example, the reduction rules may include the following:

a) If $x_i=1$ then $I_{ij}=y_j$, where $I_{ij}=x_iy_j$;
b) If $x_i=0$ then $I_{ij}=0$
c) If $x_i+y_j=2z_k$ then $x_i=y_j=z_k$
d) If all coefficients in a factor equation in the set of factor equations are positive and the constant term is zero, then every variable in the factor equation in the set of factor equations is zero.
e) If all coefficients in a factor equation in the set of factor equations are positive and the sum of the coefficients equals the constant term then every variable in the factor equation in the set of factor equations is one.
f) If the sum of all the positive coefficients and the constant term in a factor equation in the set of factor equations is less than the absolute value of a negative carry variable coefficient then an associated negative carry variable is zero.

In these rules, $x_i$ is the $i^{th}$ variable of the factor X; $y_i$ is the $i^{th}$ variable of the factor Y; $I_{ij}$ is the i, $j^{th}$ product of variables $x_i$ and $y_j$; and $s_{ij}$ is a slack variable to account for any carrying associated with product $I_{ij}$.

In addition to factoring problems, the present systems, methods and apparatus may be applied to solve other types of problems. Persons of skill in the art will appreciate that factor equations can be non-linear equations and that the identification of the solution to many problems relies upon identifying answers to sets of non-linear equations. In some cases, a set of factor equations is not used. Rather, a set of general non-linear equations is used. In such cases, at 205, the set of non-linear equations is assumed, or is taken as input and thus acts 201 and 203 are not needed and are skipped. Sets of non-linear equations that may be used include equations that arise from bit-wise multiplication of bit variable strings. Terms in the nonlinear equations may include the products of two, three or more bit variables. The set of non-linear equations may be reduced as discussed above.

Thus, returning to the factoring of integer 119, factor equations are constructed from each pair of bit string lengths from the list produced ({(2, 5), (2, 6), (3, 4), (3, 5), (4, 4)}). In some cases, the order in which the bit length pairs is processed may be optimized. For example, the bit pair length (4, 4) has more products that are seven bits long compared to (2, 5), and therefore (4, 4) is tested first. In other cases, the density of prime numbers for a bit length determines which order the bit length pairs are processed. Alternatively, all bit length pairs that add to $L_T+1$ may be processed first, since those bit length pairs have more combinations that multiply to give a number with $L_T$ bits. For example, the pairs (2, 6), (3, 5), and (4, 4) may be processed before (2, 5) and (3, 4). In other cases, multiple bit length pairs may be processed simultaneously, either on the same processor, or on separate processors, such as a series of processors set up in parallel.

As an example of the processing, consider the first bit length pair (2, 5) expanded into bit variables denoted $X=(1, 1)$ (since the most and least significant bits must be one) and $Y=(1, y_3, y_2, y_1, 1)$. Next, the long multiplication of X and Y is performed. This is illustrated below.

$$\begin{array}{ccccccc} & & 1 & y_3 & y_2 & y_1 & 1 \\ & & & & & 1 & 1 & \times \\ \hline & & 1 & y_3 & y_2 & y_1 & 1 \\ & 1 & y_3 & y_2 & y_1 & 1 & & + \\ \hline 1 & 1 & 1 & 0 & 1 & 1 & 1 \end{array}$$

From the long multiplication, the set of factor equations can be constructed as follows, using $z_i$ to represent the carries:

$y_1+1=1$ $y_2+y_1=1+2z_1$ $y_3+y_2+z_1=0+2z_2+4z_3$ $1+y_3+z_2=1+2z_4$ $1+z_3+z_4=1+2z_5$ $z_5=1$

Since the set of equations is Boolean, the coefficients 2 and 4 denote relative bit position instead of a scalar multiple. For example, the coefficient $4z_3$ indicates that the carry $z_3$ is added to the equation that is two significant bits larger (as can be seen from the presence of $z_3$ in $1+z_3+z_4=1+2z_5$). From this set of equations, row reduction can be done to eliminate some of the variables. For example, from the first equation $y_1$ can be deduced to be zero. Some rules for reduction of factor equations have been described in previous sections. Continued reduction yields the following two equations:

$y_2+1=1+2z_1$ $1+y_2+z_1=0+2+4$

As can be seen, the second equation cannot be satisfied for any value of $y_2$ and $z_1$. Therefore, since the set of factor equations is inconsistent, the bit length pair (2, 5) cannot encode the factors of 119. The process then moves on to another set of bit length pairs.

In this example, the bit length pair (3, 5) is considered. For this set, $X=(1, x, 1)$ and $Y=(1, y_3, y_2, y_1, 1)$. The long multiplication of these two numbers is shown in detail in FIG. 3. Lines 310 and 314 are the bit-wise representations of Y and X respectively. Lines 318, 322 and 326 are the intermediate multiplications resulting from multiplying line 310 by each bit in line 314 and bit-shifting the result, much like normal multiplication. Line 330 shows the result of the multiplication (the binary sum of lines 318, 322 and 326), which is the binary format of T=119.

From FIG. 3, the factor equations can be derived and are shown in FIG. 4 as the set of equations 413. The set of equations 413 can be row reduced significantly. For example, it can be readily seen that $z_5=0$. Equation set 416 shows an intermediate stage during row reduction, where $z_5$, $z_1$, and $y_1x$ have been canceled out. After the equations are reduced as far as possible, the set of factor equations that results is shown in equation set 419. Next, the term $xy_3$ is replaced by the product variable w. All terms in each equation are moved to one side and the equations are squared, as shown in equation set 422 of FIG. 4.

At 207, the set of factor equations are converted an acceptable input, such as a factor graph or an energy function, for a computing device. The computing device may be, for example, a quantum processor composed of a number of quantum devices, such as those illustrated in FIGS. 9A and 9B (discussed below). In some cases, the computing device may also include classical computing elements and interface elements between the classical and quantum aspects of the device.

Where the input is an energy function, when the energy function is fully minimized, it provides the bit values that satisfy the multiplication, if the correct bit length combination is selected (that is, satisfying the set of factor equations is equivalent to minimizing the energy function). If not, the process moves back to 205 and selects the next set of bit length combinations and attempts to minimize it. The energy function may be created by taking each equation and moving all variables to one side of the equation. In some cases, each equation is then squared and summed together, with a coefficient attached to each squared component. The coefficients are arbitrary and may be set to make the processing on the computing device more efficient.

It may be desirable in some cases to further process the energy function before it is provided to the computing device. For example, squared components in the energy function can contain quadratic terms, thus leading to quartic terms once squared. Where the computing device is a quantum processor that can only handle functions of quadratic power or less, quartic and cubic terms in the energy function may be reduced to quadratic terms. In some cases, the quartic and cubic terms may be reduced to second degree by the use of product and slack variables. An example of a product variable is replacing $x_i y_j$ with $I_{ij}$, where $I_{ij} \leq x_i$, $I_{ij} \leq y_j$, and $x_i + y_j \leq I_{ij} + 1$ ($x_i$, $y_j$ and $I_{ij}$ are being binary variables), thus reducing the quadratic term to a linear term, which then, when squared, is a quadratic term. In other cases, the inequality constraint produced by introducing a product variable may be converted to an equality constraint, which may be easier to map onto the computing device. When converted to an equality constraint, however, a new variable is introduced. For example, the inequality constraint $x_i + y_j \leq I_{ij} + 1$ can be turned into $x_i + y_j - 2I_{ij} - s_{ij} = 0$, where $s_{ij}$ is the slack variable. The equality constraint is constructed in such a fashion that if $x_i$, $y_j$, and $I_{ij}$ satisfy the inequality, then $s_{ij}$ will assume a value that satisfies the equality. If $x_i$, $y_j$, and $I_{ij}$ do not have values that satisfy the inequality, then there is no value for $s_{ij}$ that will satisfy the equality. Thus, for every quadratic term in the original factoring equation, converting to a form that can be mapped onto the computing device requires the introduction of two new variables: one product variable and one slack variable.

In accordance with an embodiment of the present systems, methods and apparatus, at 207, a prime factorization problem may be converted into an optimization problem on an analog processor comprising a set of quantum devices. To accomplish this conversion, the energy function is first converted to a factor graph (that is, a graphical representation of quadratic interactions between variables). In such a representation, the nodes of the graph are variables while edges in the graph connect two variables that occur in the function. Where all components of the energy equation are squared, the energy function can be cast into a factor graph. Variables in a squared component of the energy equation give a connected subgraph in the factor graph. Once a factor graph is created, it can then be mapped onto the quantum processor, such as those shown in FIGS. 9A and 9B below. The nodes are the quantum devices, e.g. qubits that represent variables, and the strengths of the couplings between the nodes are chosen to represent the coefficients linking paired variables.

The energy function may then be converted into matrix form. An example of the matrix form is:

$$E(x) = xQ^T x + r^T x \quad (1)$$

where Q is the symmetric matrix of coefficients between quadratic non-identical bit pairs, r is the vector of coefficients for quadratic terms in the energy function, and x is vector of bit variables. The components of E(x) can be generated by expanding the full energy function and collecting like terms. The necessary optimization constraints for the computing device, such as coupling strengths between quantum devices, can easily be extracted from the matrix form of the energy function.

Returning to the example factoring of the integer 119, the reduced set of factor equations 422 from FIG. 4 is then summed into a single function, called the energy function, and is shown in FIG. 5 as equation 501, where $\mu_i$ and $\lambda_i$ are arbitrary positive coefficients. These coefficients may be chosen to make the computation on the computing device (such as a quantum processor) more efficient (e.g. making the evolution quicker). Also included in the energy function are the equality constraints with the slack variables $s_1$, $s_2$, and $s_3$ respectively corresponding to the inequalities $w \leq x$, $w \leq y_3$, and $x + y_3 \leq w + 1$. The corresponding equality constraints are then $$w - y_3 + s_1 = 0$$

$$w - x + s_2 = 0$$

$$x + y_3 - w + s_3 - 1 = 0$$

Energy function 501 is then put into matrix form, as described above. For this example, the matrices are shown in FIG. 5. Matrix 505 is Q, matrix 507 is −r, and matrix 509 is x.

Figure 6:
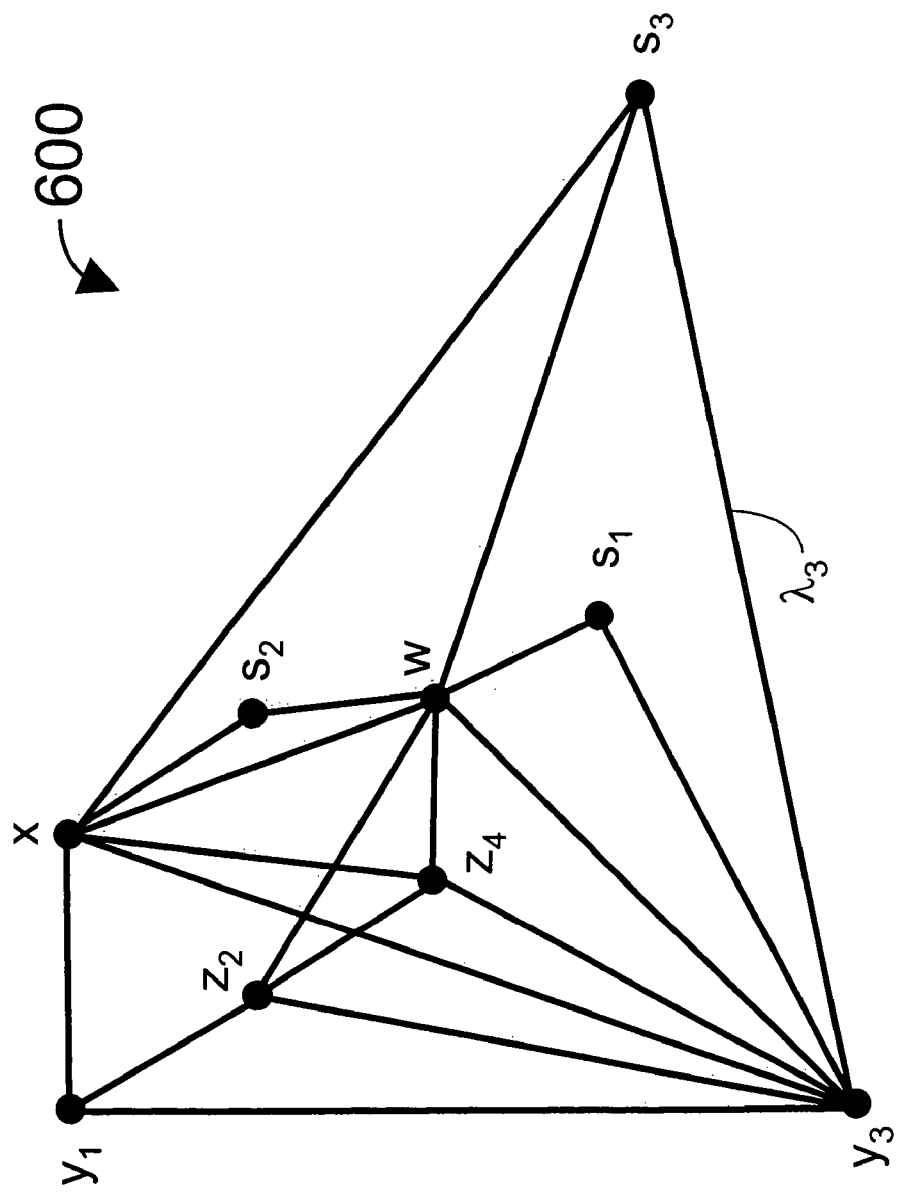
FIG. 6 is a schematic diagram of a factor graph.

With all the coefficients in matrix form, a factor graph 600 of the energy function can now be constructed, as illustrated in FIG. 6. Black circles represent the bit variables, while the edges represent quadratic bit pairings in the energy function. Each edge has a weighting associated with it, which corresponds to the coefficient pre-factor in the Q matrix. For example, the edge between $y_3$ and $s_3$ is weighted $\lambda_3$, which corresponds to the last row, second column value in Q. Likewise, the values of rare weightings for each respective vertex. In some cases, the factor graph may be constructed from the matrix using a classical computer.

Figure 7:
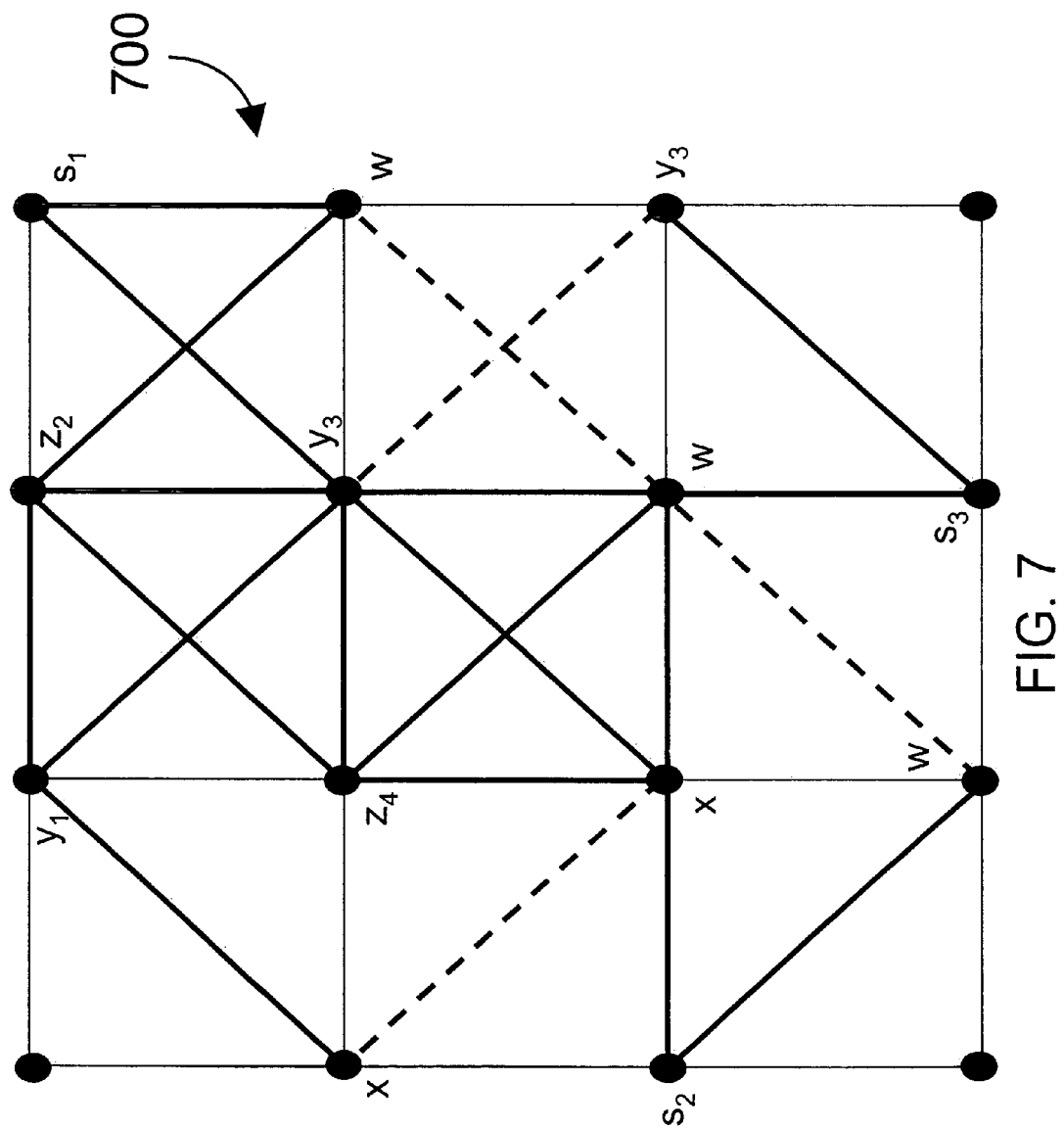
FIG. 7 is a schematic diagram of an embodiment of embedding the factor graph of FIG. 8 onto a two-dimensional grid.

Next, the factor graph is embedded onto a graph that can be applied to the analog processor. For example, where the structure of the analog processor is such that a two-dimensional grid is desirable, graph 600 may be embedded onto a two-dimensional planar grid, such as graph 700 of FIG. 7. The edges from graph 600, represented by thick black lines in graph 700, connect nearest (horizontal and vertical) or next-nearest neighbor vertices (diagonal), used vertices being represented by black circles in graph 700. Dashed lines represent multiple nodes that are effectively the same edge. For example, the variable w is copied across three nodes. This means that any other edge that would connect to w can connect to any of its three nodes. The embedding shown here may be considered to be "efficient" in that it uses the fewest nodes, the fewest vertices, and the smallest grid area (4 by 4 nodes) possible. Three nodes are not used in the mapping and therefore are not connected to any of the other nodes. However, not all embeddings may be efficient for the optimization portion of the method, and so multiple embeddings might have to be created.

The embedding of a factor graph onto a two-dimensional grid can be done on a classical computer. There are classical algorithms in the art that can achieve graph embedding with relative efficiency, including linear time. Graph embedding algorithms take a data structure that describes which nodes of a graph are connected, e.g., an adjacency matrix, and draw the graph in a regular fashion, e.g., with horizontal, vertical, and sometimes diagonal lines. One collection of algorithms for such purpose are found in the C++ program library Library of Efficient Data types and Algorithms (LEDA). It has been developed, since 1988, by the Max-Planck-Instutut in Saarbrücken, Germany. It provides the data structures and algorithms for constructing straight-line planar-grid embeddings. See, Mehlhorn and Näther, 1995, "LEDA, a platform for combinatorial and geometric computing," Communications of the ACM 38, pp. 96-102; Eades and Tamassia, 1989, "Algorithms for Drawing Graphs: An Annotated Bibliography," Technical Report CS-89-09, Department of Computer Science, Brown University, Providence, R.I., USA.

Once completed, the embedding is applied as the initial condition of the analog processor. For example, where the analog processor is composed of a grid of quantum and coupling devices such as those shown in FIGS. 9A and 9B below, the appropriate values of coupling $J_{ij}$ for the coupling devices may be determined by the components of matrix Q, while values of local bias $h_i$ for the quantum devices are determined by the vector r. Each coupling device is initialized with a coupling strength that is proportional to the weighting of the corresponding edge in the factor graph. The coupling devices may be configurable to couple quantum devices together ferromagnetically and anti-ferromagnetically. These two types of coupling are used to distinguish coefficients with different signs. Another use of ferromagnetic coupling is to extend the number of nodes that represent a variable, such as w in FIG. 7.

At 209, with the factor graph embedded as an initial state of the analog processor, the processor is allowed to evolve. Evolution allows the set of quantum devices to find its ground state, and may include letting the Hamiltonian of the processor move away from an initial excited state and attempting to find the ground state or a lower excited state of the same Hamiltonian. The ground state is the minimum energy state of the energy function, and can be mapped to a solution to the factor equations (if there is a solution). The ground state is an assignment of values, or states, to the quantum devices in the processor. The evolution can take many forms including, but not limited to, adiabatic evolution, quasi-adiabatic evolution, annealing by temperature, annealing by magnetic field, and annealing of barrier height.

For example, the initial state of the analog processor may include a configuration of local biases for each quantum device within the processor and a configuration of couplings with associated coupling strengths between each of the quantum devices. These configurations give rise to an initial multi-device quantum state of the entire processor. In some embodiments, the local biases depend on the vector r and the couplings depend on the matrix Q. The coupling configuration of the processor produces a specific energy landscape, with the initial state occupying one point on the landscape, which may be the ground state.

The processor may be configured to perform an adiabatic evolution, that is, letting an initial quantum state evolve slowly from the ground state of an initial Hamiltonian to a final Hamiltonian. When the Hamiltonian is changed adiabatically, the quantum state of the processor will always remain in its ground state. The final Hamiltonian encodes the solution of the optimization problem. Changing of the Hamiltonian can be effected by changing the local quantum device bias or by changing the strength of the couplings. This method includes configuring the system such that the final Hamiltonian encodes the constraints that describe the energy landscape, e.g., what was referred to as the initial state. See, for example, U.S. Patent Applications Ser. Nos. 2005-0256007 A1, 2005-0250651 A1, and 2005-0224784 A1, each entitled "Adiabatic Quantum Computation with Superconducting Qubits," which are each hereby incorporated by reference in their entirety.

Annealing is another type of evolution process and involves slowly raising or lowering a variable of the quantum system. The idea behind annealing is to start the quantum system in a highly excited state that can explore a wide range of the system's energy landscape, searching for the global minimum of the system. Then, by slowly changing a variable of the system, the movement of the quantum state is restricted. As the excitation dies down, the quantum state will, with a large probability, settle into the lowest energy minimum it can find. It is hoped that this minimum is in fact the global minimum. The one or more variables of the system that can be changed include temperature (high to low), magnetic field (high to low), and energy barrier height between minima (low to high). Each annealing process has an associated annealing time, which characterizes the rate the variable of the system is changed. In some cases, the annealing time may be selected so as to allow enough time for the quantum state to find its lowest energy configuration. If the annealing time is too short, then the quantum state may not have enough time to settle into the global minimum. If the annealing time is too long, then there is wasted time in the computation. In some cases, the quantum state does not reach the global minimum but reaches a minimum slightly above the global minimum.

Once the analog processor has reached a final state, at 211 a set of assignments for the variables in the factor graph are read out. For example, where the analog processor includes a set of quantum devices, the set of assignments may be read out by reading out the states of one or more quantum devices. These states are value assignments to the variables in the factor graph and hence the variables in the factor equations. In some cases, the states may be assignments for variables in the reduced factor equations.

At 213, the factors X and Y are constructed (using the set of variable assignments and the factor equations or reduced factor equations) and used to determine if an answer to the factorization problem has been found. If the process is successful, the final state of the analog processor encodes the value of the bit variables that satisfy the factor equations, assuming such equations can in fact be satisfied. If the factor equations are not satisfied, then the bit length combination that was used to construct the factor equations at 205 does not contain the prime factors of T, in which case the process returns to 205, selecting a different bit length combination. (Where more than one bit length combination was processed simultaneously, control may not return to 205, since the prime factors may have been found through one of the parallel runs.) In some cases, process 200 repeats initialization and evolution (207 through 213) with all input parameters unchanged and the final quantum state encoded from each of these repeated runs is used to arrive at the solution with a calculated probability, where the calculated probability is a function of the number of times acts 207 through 213 were repeated using the same input parameters.

In some cases, a new embedding of the factor graph onto the analog processor is found and the process continues from 207. In other cases, a different type of evolution may be attempted. In such cases, acts 209 through 213 may be repeated, with each repeat employing a different type of evolution. After a sufficient amount of time, the states of the nodes are measured. Sometimes, the states of the system variables can get stuck in a local minimum. Therefore, in some cases, the evolution of the analog processor may be done more than once for the same initial state, different annealing times may be used in multiple evolutions of the same initial state, or the type of evolution may differ from run to run.

In each of the examples described above, a determination is made to see whether the factor equations are satisfied at 213. When the factor equations are satisfied, the bit variables are converted to numbers X and Y and tested to determine whether they really are the prime factors of T (i.e., a set of true factors). If they are, the problem has been solved. If not, then process 200 moves on to the next bit length combination and repeats acts 205 to 213 (not always necessary in the case where bit length combinations were processed in parallel).

In the case of the integer 119, the factors produced are X=7 and Y=17. In this case, both factors are prime (confirming the hypothesis that the integer 119 is biprime). However, in some cases, if T is a general composite number or multi-prime, the factors themselves are then factored, if possible, to produce a set of prime factors for T. Thus, the method described for factoring T can be applied to either X or Y, or both. For example, the number 12 can be factored into 2 and 6 and the number 6, in turn, can be factored into 2 and 3. Therefore the set of prime factors for 12 is 2, 2, and 3. A number can be tested for primality in polynomial time.

FIG. 8A shows a quantum device 800 suitable for use in some embodiments of the present systems, methods and apparatus. Quantum device 800 includes a superconducting loop 803 interrupted by three Josephson junctions 801-1, 801-2 and 801-3. Current can flow around loop 803 in either a clockwise direction (802-0) or a counterclockwise direction (802-1), and in some embodiments, the direction of current may represent the state of quantum device 800. Unlike classical devices, current can flow in both directions of superconducting loop 803 at the same time, thus enabling the superposition property of qubits. Bias device 810 is located in proximity to quantum device 800 and inductively biases the magnetic flux through loop 803 of quantum device 800. By changing the flux through loop 803, the characteristics of quantum device 800 can be tuned.

Quantum device 800 may have fewer or more than three Josephson junctions. For example, quantum device 800 may have only a single Josephson junction, a device that is commonly known as an rf-SQUID (i.e. "superconducting quantum interference device"). Alternatively, quantum device 800 may have two Josephson junctions, a device commonly known as a dc-SQUID. See, for example, Kleiner et al., 2004, *Proc. of the IEEE* 92, pp. 1534-1548; and Gallop et al., 1976, *Journal of Physics E: Scientific Instruments* 9, pp. 417-429.

Fabrication of quantum device 800 and other embodiments of the present systems, methods and apparatus is well known in the art. For example, many of the processes for fabricating superconducting circuits are the same as or similar to those established for semiconductor-based circuits. Niobium (Nb) and aluminum (Al) are superconducting materials common to superconducting circuits, however, there are many other superconducting materials any of which can be used to construct the superconducting aspects of quantum device 800. Josephson junctions that include insulating gaps interrupting loop 803 can be formed using insulating materials such as aluminum oxide or silicon oxide to form the gaps.

The potential energy landscape 850 of quantum device 800 is shown in FIG. 8B. Energy landscape 850 includes two potential wells 860-0 and 860-1 separated by a tunneling barrier. The wells correspond to the directions of current flowing in quantum device 800. Current direction 802-0 corresponds to well 860-0 while current direction 802-1 corresponds to well 860-1 in FIGS. 8A and 8B. However, this choice is arbitrary. By tuning the magnetic flux through loop 803, the relative depth of the potential wells can be changed. Thus, with appropriate tuning, one well can be made much shallower than the other. This may be advantageous for initialization and measurement of the qubit.

While quantum device 800 shown in FIGS. 8A and 8B is a superconducting qubit, quantum device may be any other technology that supports quantum information processing and quantum computing, such as electrons on liquid helium, nuclear magnetic resonance qubits, quantum dots, donor atoms (spin or charges) in semiconducting substrates, linear and non-linear optical systems, cavity quantum electrodynamics, and ion and neutral atoms traps.

Where quantum device 800 is a superconducting qubit as shown in FIGS. 8A and 8B, the physical characteristics of quantum device 800 include capacitance (C), inductance (L), and critical current ($I_C$), which are often converted into two values, the Josephson energy ($E_J$) and charging energy ($E_C$), and a dimensionless inductance ($\beta_L$). Those of skill in the art will appreciate that the relative values of these quantities will vary depending on the configuration of quantum device 800. For example, where quantum device 800 is a superconducting flux qubit or a flux qubit, the thermal energy ($k_B T$) of the qubit may be less than the Josephson energy of the qubit, the Josephson energy of the qubit may be greater than the charging energy of the qubit, or the Josephson energy of the qubit may be greater than the superconducting material energy gap of the materials of which the qubit is composed. Alternatively, where quantum device 800 is a superconducting charge qubit or a charge qubit, the thermal energy of the qubit may be less than the charging energy of the qubit, the charging energy of the qubit may be greater than the Josephson energy of the qubit, or the charging energy of the qubit may be greater than the superconducting material energy gap of the materials of which the qubit is composed. In still another alternative, where the quantum device is a hybrid qubit, the charging energy of the qubit may be about equal to the Josephson energy of the qubit. See, for example, U.S. Pat. No. 6,838,694 B2; and U.S. Patent Publication US 2005-0082519-A1 entitled "Superconducting Phase-Charge Qubits," each of which is hereby incorporated by reference in its entirety.

Figure 8C:
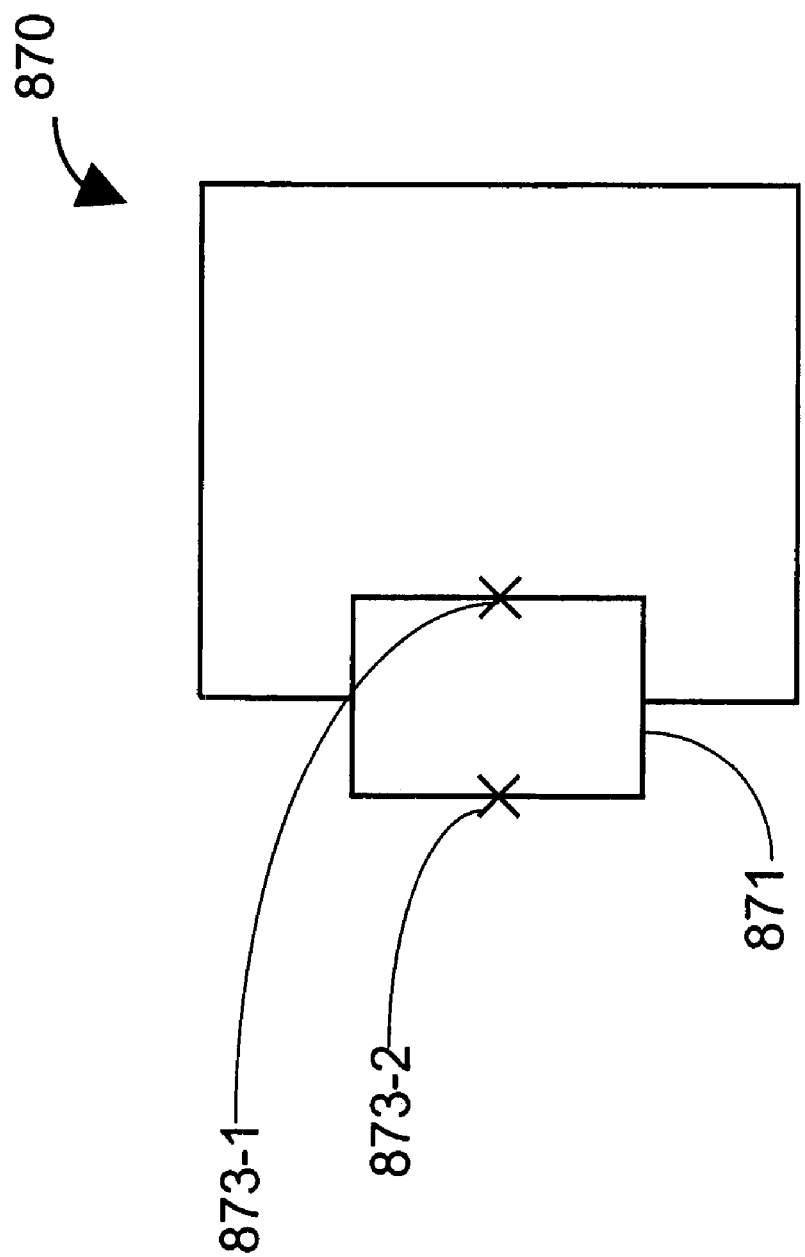
FIG. 8C is a schematic diagram showing an existing compound junction in which two Josephson junctions are found in a superconducting loop.

The charging and Josephson energies, as well as other characteristics of a Josephson junction, can be defined mathematically. The charging energy of a Josephson junction is $e^2/2C$ where e is the elementary charge and C is the capacitance of the Josephson junction. The Josephson energy of a Josephson junction is $(\hbar/2e)I_C$. If the qubit has a split or compound junction, the energy of the Josephson junction can be controlled by an external magnetic field that threads the compound junction. A compound junction includes two Josephson junctions in a small superconducting loop. For example, FIG. 8C illustrates a device 870 in which a compound junction having two Josephson junctions 873 are found in a small superconducting loop 871. The Josephson energy of the compound junction can be tuned from about zero to twice the Josephson energy of the constituent Josephson junctions 873. In mathematical terms, $$E_J = 2E_J^0 \left| \cos\left(\frac{\pi \Phi_X}{\Phi_0}\right) \right|$$

where $\Phi_X$ is the external flux applied to the compound Josephson junction, and $E_J^0$ is the Josephson energy of one of the Josephson junctions in the compound junction. The dimensionless inductance β of a qubit is $2\pi L I_c/\phi_0$, where $\phi_0$ is the flux quantum. In some cases, β may range from about 1.2 to about 1.8, while in other cases, β is tuned by varying the flux applied to a compound Josephson junction.

Again, those of skill in the art will appreciate that a wide variation of type of quantum device 800 may be employed in the present systems, methods and apparatus. For example, a qutrit may be used (i.e., a quantum three level system, having one more level compared to the quantum two level system of the qubit). Alternatively, the quantum device 800 may have or employ energy levels in excess of three. The quantum devices described herein can be improved with known technology. For instance, quantum device 800 may include a superconducting qubit in a gradiometric configuration, since gradiometric qubits are less sensitive to fluctuations of magnetic field that are homogenous across the qubit.

Figure 9B:
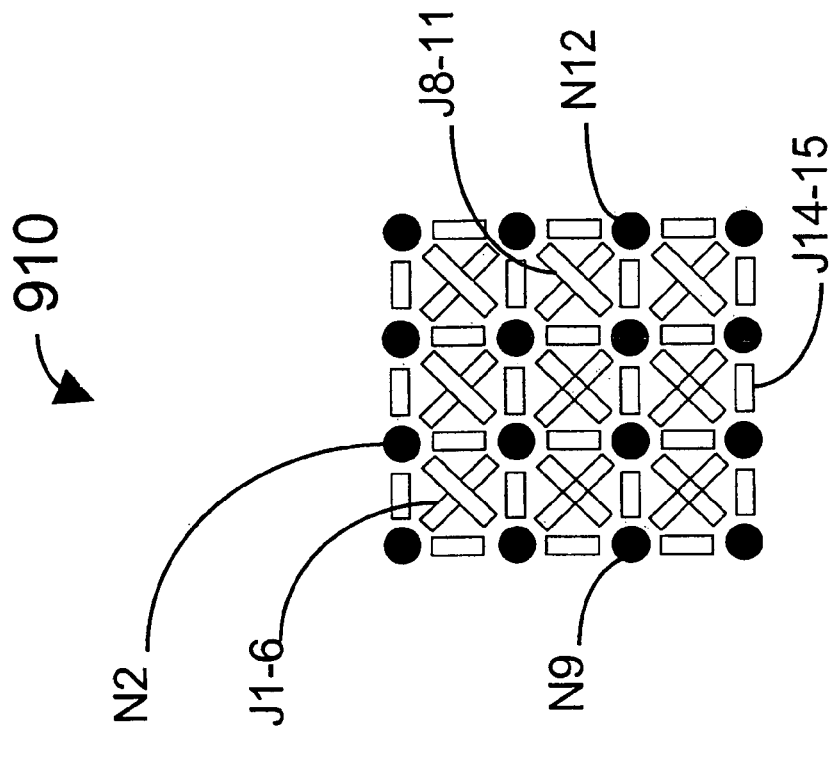
FIGS. 9A and 9B are schematic diagrams illustrating exemplary two-dimensional grids of quantum devices in accordance with aspects of the present systems, methods and apparatus.
Figure 9A:
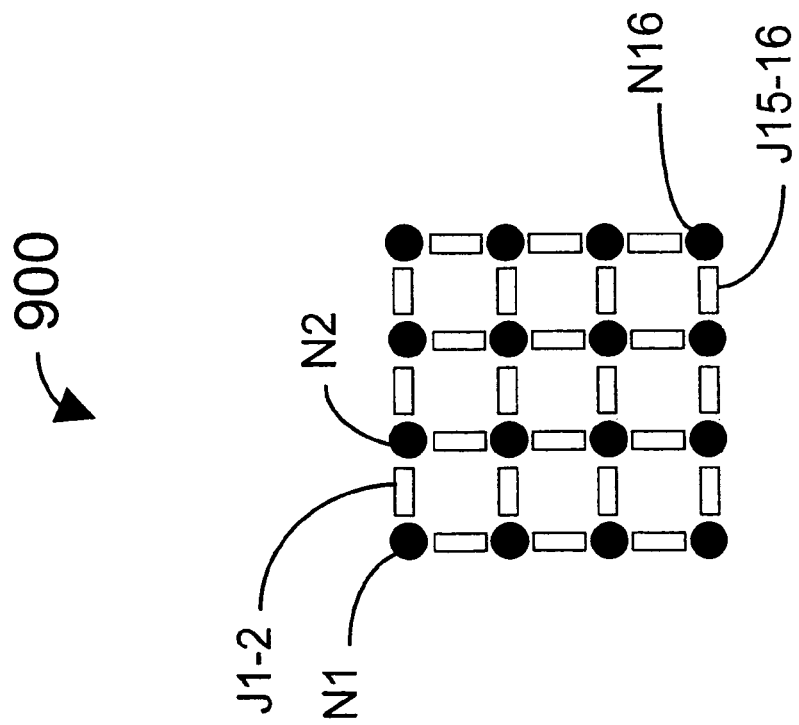

FIGS. 9A and 9B illustrate sets of quantum devices in accordance with aspects of the present systems, methods and apparatus. FIG. 9A shows a two-dimensional grid 900 of quantum devices N1 through N16 (only N1, N2 and N16 are labeled), each quantum device Nk being coupled together to its nearest neighbors via coupling devices Ji-k (only J1-2 and J15-16 are labeled). Quantum devices N may include, for example, the three junction qubit 800 of FIG. 8A, rf-SQUIDs, and dc-SQUIDs, while coupling devices J may include, for example, rf-SQUIDs and dc-SQUIDs. Those of skill in the art will appreciate that grid 900 may include any number of quantum devices Nk.

Coupling devices Ji-k may be tunable, meaning that the strength of the coupling between two quantum devices created by the coupling device can be adjusted. For example, the strength of the coupling may be adjustable (tunable) between about zero and a preset value, or the sign of the coupling may be changeable between ferromagnetic and anti-ferromagnetic. (Ferromagnetic coupling between two quantum devices means it is energetically more favorable for both of them to hold the same basis state (e.g. same direction of current flow), while anti-ferromagnetic coupling means it is energetically more favorable for the two devices to hold opposite basis states (e.g. opposing directions of current flow)). Where grid 900 includes both types of couplings, it may be used to simulate an Ising system, which can be useful for quantum computing, such as thermally-assisted adiabatic quantum computing. Examples of coupling devices include, but are not limited to, variable electrostatic transformers and rf-SQUIDs with $β_L<1$. See, for example, U.S. patent application Ser. No. 11/100,931 entitled "Variable Electrostatic Transformer," and U.S. patent application Ser. No. 11/247,857, entitled "Coupling Schemes for Information Processing," each of which is hereby incorporated be reference in its entirety.

FIG. 9B illustrates a two-dimensional grid 910 of quantum devices N coupled by coupling devices J. In contrast to FIG. 9A, each quantum device N is coupled to both its nearest neighbors and its next-nearest neighbors. The next-nearest neighbor coupling is shown as diagonal blocks, such as couplings J1-6 and J8-11. The next nearest neighbor coupling shown in grid 910 may be beneficial for mapping certain problems onto grid 910. For example, some optimization problems that can be embedded on a planar grid can be embedded using fewer quantum devices when next-nearest neighbor coupling is available. Those of skill in the art will appreciate that grid 910 may be expanded or contracted to include any number of quantum devices. In addition, the connectivity between some or all of the quantum devices in grid 910 may be greater or lesser than that shown.

Figure 10:
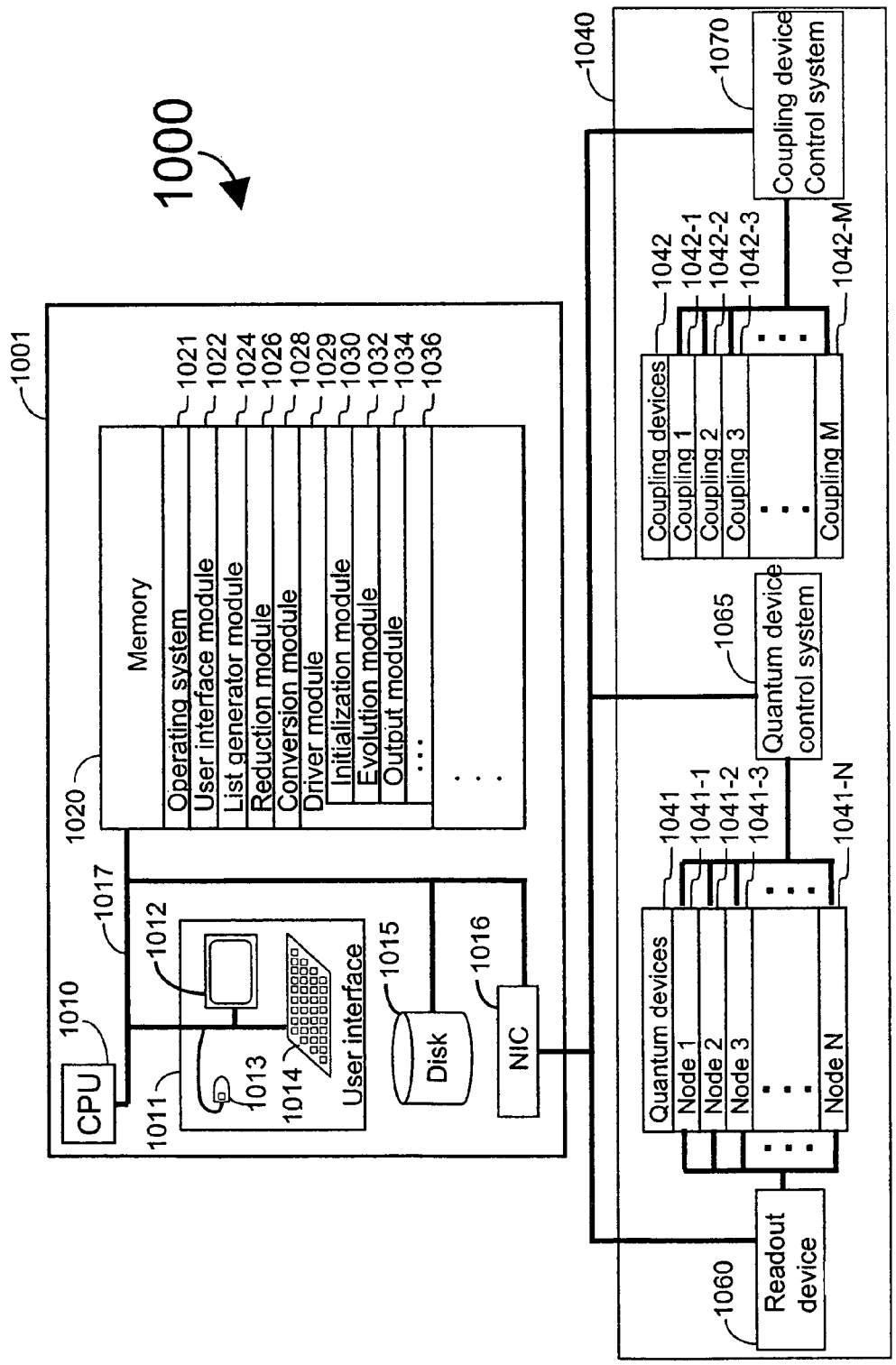
FIG. 10 is a block diagram of an embodiment of a computing system.

Factoring may be done through a combination of classical and analog computing devices, such as, for example, where a classical computing device handles the pre- and post-processing and a quantum computing device handles the optimization. FIG. 10 illustrates a system 1000 that may be operated in accordance with one embodiment of the present systems, methods and apparatus. System 1000 includes digital (binary, conventional, classical, etc.) interface computer 1001 configured to receive an input, such as the number to be factored.

Computer 1001 includes standard computer components including a central processing unit 1010, data storage media for storing program modules and data structures, such as high speed random access memory 1020 as well as non-volatile memory, such as disk storage 1015, user input/output subsystem 1011, a network interface card (NIC) 1016 and one or more busses 1017 that interconnect some or all of the aforementioned components. User input/output subsystem 1011 includes one or more user input/output components such as a display 1012, mouse 1013 and/or keyboard 1014.

System 1000 further includes a processor 1040, such as a quantum processor having a plurality of quantum devices 1041 and a plurality of coupling devices 1042, such as, for example, those described above in relation to FIGS. 9A and 9B. Processor 1040 is interchangeably referred to herein as a quantum processor, analog processor or processor.

System 1000 further includes a readout device 1060. In some embodiments, readout device 1060 may include a plurality of dc-SQUID magnetometers, each inductively connected to a different quantum device 1041. In such cases, NIC 1016 may receive a voltage or current from readout device 1060, as measured by each dc-SQUID magnetometer in readout device 1060. Processor 1040 further comprises a controller 1070 that includes a coupling control system for each coupling device 1042, each coupling control system in control device 1070 being capable of tuning the coupling strength of its corresponding coupling device 1042 through a range of values, such as between $-|J_c|$ to $+|J_c|$, where $|J_c|$ is a maximum coupling value. Processor 1040 further includes a quantum device control system 1065 that includes a control device capable of tuning characteristics (e.g. values of local bias $h_i$) of a corresponding quantum device 1041.

Memory 1020 may include an operating system 1021. Operating system 1021 includes procedures for handling various system services, such as file services, and for performing hardware-dependent tasks. The programs and data stored in system memory 1020 may further include a user interface module 1022 for defining or for executing a problem to be solved on processor 1040. For example, user interface module 1022 may allow a user to define a problem to be solved by setting the values of couplings $J_{ij}$ and the local bias $h_i$, adjusting run-time control parameters (such as evolution schedule), scheduling the computation, and acquiring the solution to the problem as an output. User interface module 1022 may include a graphical user interface (GUI) or it may simply receive a series of command line instructions that define a problem to be solved.

Memory 1020 may further include a list generator module 1024 that generates a list of possible factor bit lengths L. For example, list generator module 1024 may be used to trim and order the entries in list L, or to create a set of all possible factor bit lengths for a given T supplied by a user. List L can be trimmed by excluding the factor bit lengths for bits lengths for which all factors have been excluded. This division could be done by CPU 1010 or by another computer coupled to computer 1001 by a LAN, WAN, Internet, other forms of networks, and/or other forms of electronic communication (e.g., ethernet, parallel cable, or serial connection). Alternatively, list generator module 1024 may trim list L using information supplied by other modules.

Memory 1020 may include a reduction module 1026 for reducing the factor equations for a corresponding factor combination selected from the list of combinations L. For instance, the factor equations may be reduced by row reduction over binary or real values or by computing binary or integer solutions to a subset of equations. For example, methods used for solving Diophantine equations, such as computing least common multiples, and greatest common denominators may be implemented in reduction module 1026. Reduction module 1026 may also include routines for determining an optimal time to terminate the reduction of the factor equations, e.g. to balance the time complexity of reduction with the space complexity of embedding the optimization problem into processor 1040. Such optimization (determination of when to stop reduction) may be based on many factors, such as performance observed in solving prior factorization problems, heuristic approaches, and mathematical modeling.

Memory 1020 may further include a conversion module 1028 for the conversion of a factoring problem, as defined by a set of factor equations, to an optimization problem. For example, conversion module 1028 may convert the set of factor equations into an energy function (as described in reference to 207 of process 200 (FIG. 2)). Conversion module 1028 may also create a factor graph, including the appropriate edge and node weights, e.g., values of couplings and local fields, for the given (reduced) set of factor equations.

Conversion module 1028 may reduce quartic terms in an energy equation to quadratic terms. For example, conversion module 1028 may replace the quartic terms with product and slack variables. An example of a product variable is the replacement of $x_i y_j$ with $I_{ij}$, where $I_{ij} \leq x_i$, $I_{ij} \leq y_j$, and $x_i + y_j \leq I_{ij} + 1$. In some cases, the inequality constraint produced by introducing a product variable is converted to an equality constraint, which can be easier to map onto some processors. For example, the inequality constraint above can be turned into $x_i + y_j - 2I_{ij} - s_{ij} = 0$, where $s_{ij}$ is the slack variable. The equality constraint is constructed in a fashion such that, if $x_i$, $y_j$, and $I_{ij}$ satisfy the inequality, then $s_{ij}$ will assume a value that satisfies the equality.

Memory 1020 may further include a driver module 1029 for outputting signals to processor 1040. Driver module 1029 may include an initialization module 1030, evolution module 1032 and output module 1034. For example, initialization module 1030 may determine the appropriate values of coupling $J_{ij}$ for the coupling devices 1042 and values of local bias $h_i$ for the quantum devices 1041 of processor 1040, for a given problem, as defined by user interface module 1022. In some cases, initialization module 1030 may include instructions for converting aspects in the definition of the problem into physical values, such as coupling strength values and node bias values, which can be programmed into processor 1040. Initialization module 1030 then sends the appropriate signals along bus 1017, into NIC 1016 which, in turn, sends appropriate commands to quantum device control system 1065 and controller 1070.

Alternatively, evolution module 1032 may determine the appropriate values of coupling $J_{ij}$ for coupling devices 1042 and values of local bias $h_i$ for quantum devices 1041 of processor 1040 in order to fulfill some predetermined evolution, e.g., an annealing schedule. Evolution module 1032 then sends the appropriate signals along bus 1017, into NIC 1016, which then sends commands to quantum device control system 1065 and coupling device control system 1070. Output module 1034 is used for processing and providing the solution provided by processor 1040.

NIC 1016 may include hardware for interfacing with quantum devices 1041 and coupling devices 1042 of processor 1040, either directly or through readout device 1060, quantum device control system 1065, and/or coupling device control system 1070, or software and/or hardware that translates commands from driver module 1029 into signals (e.g., voltages, currents) that are directly applied to quantum devices 1041 and coupling devices 1042. NIC 1016 may include software and/or hardware that translates signals, representing a solution to a problem or some other form of feedback, from quantum devices 1041 and coupling devices 1042 such that it can be provided to output module 1034.

Memory 1020 may include a preprocessing module (not shown), including instructions for CPU 1010 to compute a combination of factor lengths and to derive a set of factor equations from the combination of factor lengths, to reduce the set of factor equations, and/or to convert the set of factor equations into an energy function and reduce the degree of the leading term in the energy function from quartic to quadratic, or cubic to linear. For example, the set of factor lengths may be computed for a biprime, such as a biprime obtained from a published public key for a public key encryption system. The preprocessing module may also include instructions for converting the energy function to a factor graph, e.g., as per 207 of process 200. Those of skill in the art will appreciate that any one of acts 201 through 207 and 213 may be performed by a computational device separate to but communicating with system 1000.

While a number of modules and data structures resident in memory 1020 of FIG. 10 have been described, it will be appreciated that at any given time during operation of system 1000, only a portion of these modules and/or data structures may in fact be resident in memory 1020. In other words, there is no requirement that all or a portion of the modules and/or data structures shown in FIG. 10 may be located in memory 1020. In fact, at any given time, all or a portion of the modules and/or data structures described above in reference to memory 1020 of FIG. 10 may, in fact, be stored elsewhere, such as in non-volatile storage 1015, or in one or more external computers, not shown in FIG. 10, that are addressable by computer 1001 across a network (e.g., a wide area network such as the Internet).

Furthermore, while the software instructions have been described above as a series of modules (1021, 1022, 1024, 1026, 1028, 1029, 1030, 1034, and 1036), it will be appreciated by those of skill in the art that the present systems, methods and apparatus are not limited to the aforementioned combination of software modules. The functions carried out by each of these modules described above may be located in any combination of software programs, including a single software program, or a plurality of software programs and there is no requirement that such programs be structured such that each of the aforementioned modules are present and exist as discrete portions of the one or more software programs. Such modules have been described simply as a way to best convey how one or more software programs, operating on computer 1001, would interface with processor 1040 in order to compute solutions to the various problem.

In another aspect of the present systems, methods and apparatus, a number is factored by running a multiplication circuit in reverse. Multiplication circuits, such as arithmetic logic units, are present in many different digital circuits and provide a regular circuit structure for handling bitwise arithmetic operations. See, for example, Jung et al., 2004, *Superconducting Science & Technology* 17, pp. 770-774.

Figure 11:
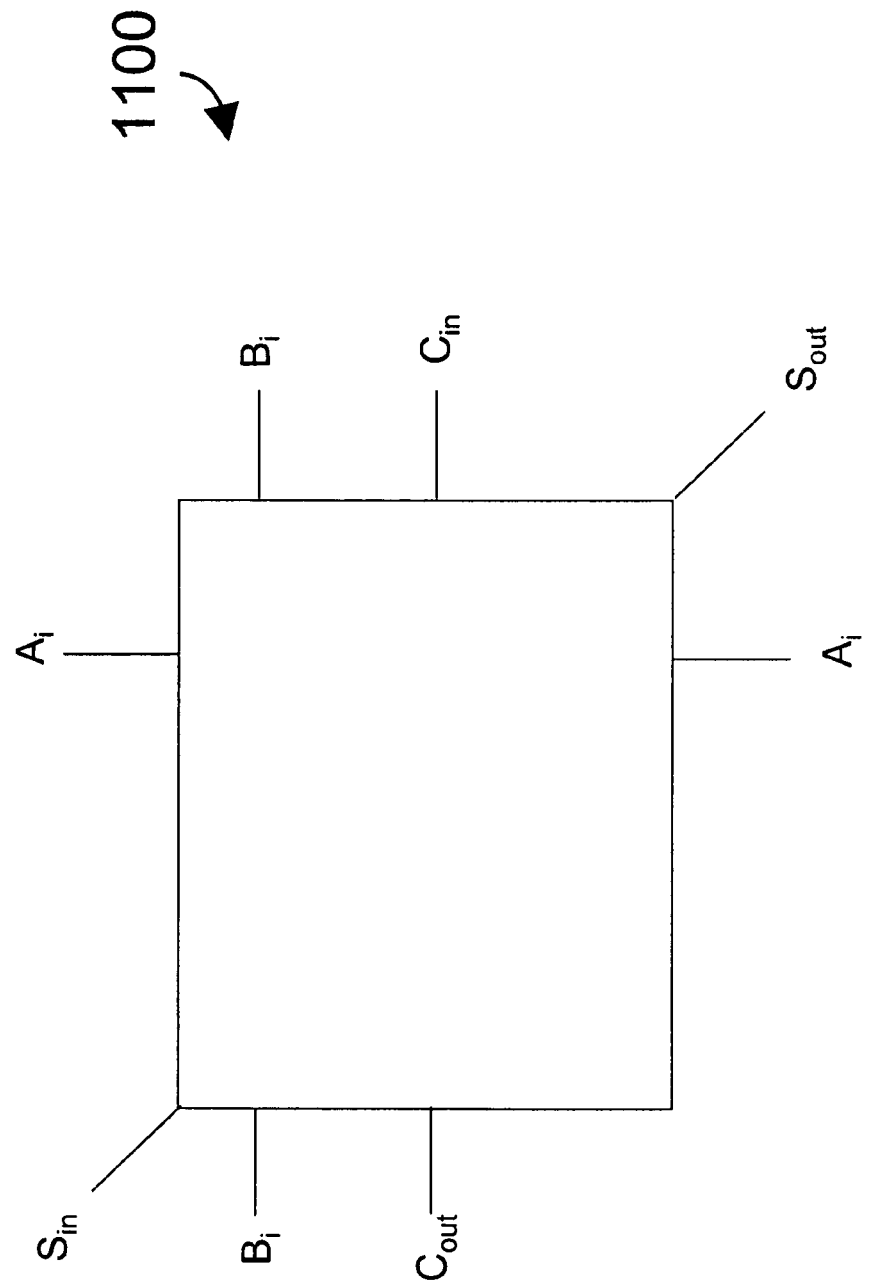
FIG. 11 is a schematic diagram of an embodiment of a bitwise multiplier.

FIG. 11 shows an embodiment of a bitwise multiplier 1100 in a multiplication circuit. The bitwise multiplier comprises 4 inputs ($A_i$, $B_i$, $S_{in}$, $C_{in}$) and 4 outputs ($A_i$, $B_i$, $S_{out}$, $C_{out}$). $A_i$ and $B_i$ are the two bits to be multiplied together, and are also propagated as outputs to other parts of the circuit. $S_{in}$ is the product of the multiplication of the next lowest significant bits, while $C_{in}$ is the carry-over from the multiplication of the next lowest significant bits. $S_{out}$ is the product of the bitwise multiplication of $A_i$ and $B_i$ and $C_{out}$ is the carry over from the multiplication of bits $A_i$ and $B_i$. The outputs are calculated as:

$$S_{out} = (A_i \vee B_i) \oplus S_{in} \oplus C_{in}$$

$$C_{out} = ((A_i \vee B_i) \vee S_{in}) \wedge (C_{in} \vee (A_i \vee B_i) \wedge (S_{in} \vee C_{in}))$$

where $\vee$ is a logical OR, $\wedge$ is a logical AND, and $\oplus$ is a logical exclusive OR.

There is normally more than one bitwise multiplier in a multiplication circuit. The binary representation of the numbers to be multiplied are inputted to a chain of bitwise multipliers. The two lowest significant bits are multiplied first, and then the result and carry over are used as additional inputs for the multiplication of the next-highest significant bit.

Figure 12:
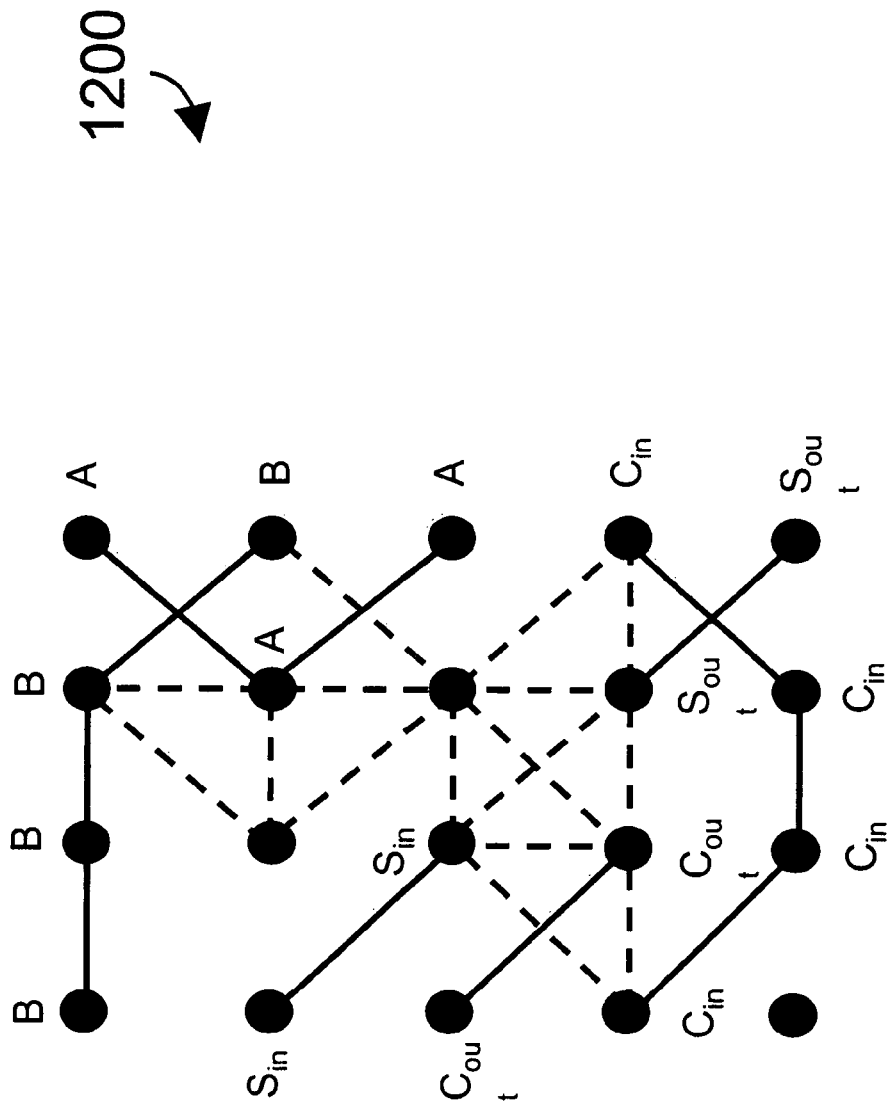
FIG. 12 is a schematic diagram of an embodiment of a bitwise multiplier constructed from qubits.

FIG. 12 illustrates an embodiment of an embedding 1200 of the bitwise multiplier circuit shown in FIG. 11 onto a lattice of quantum devices, such as grid 910 illustrated in FIG. 9B. The dark circles represent qubit nodes, with each qubit representing an input or an output of the bitwise multiplier ($A_i$, $B_i$, $S_{in}$, $C_{in}$, $A_i$, $B_i$, $S_{out}$, $C_{out}$). Lines, solid or dashed, connecting qubit nodes together represent coupling devices that provide coupling between two qubits. As can be seen, both nearest neighbor and next-nearest neighbor couplings are present. Coupling devices that do not provide any coupling are not shown in FIG. 12, but that does not mean they are not present. Solid lines represent ferromagnetic couplings between qubit nodes that represent the same input or output. Ferromagnetic coupling tends to force qubits to hold the same state, thus ensuring that all qubits representing a particular input or output has the same value. Dashed lines represent couplings between qubits representing different inputs or outputs. They can either be ferromagnetic or anti-ferromagnetic and are chosen so they properly simulate the behavior of bitwise multiplier 1100.

Embeddings of bitwise multiplier 1100 onto a set of quantum devices are not unique. Embedding 1200 of FIG. 12 is one such embedding on a 5×4 lattice of qubits with associated coupling devices. However, those of skill in the art will appreciate that many variations of the embedding are possible, even within the same lattice. For example, fewer or more qubits and coupling devices may be used for various embeddings onto a given lattice.

Figure 13:
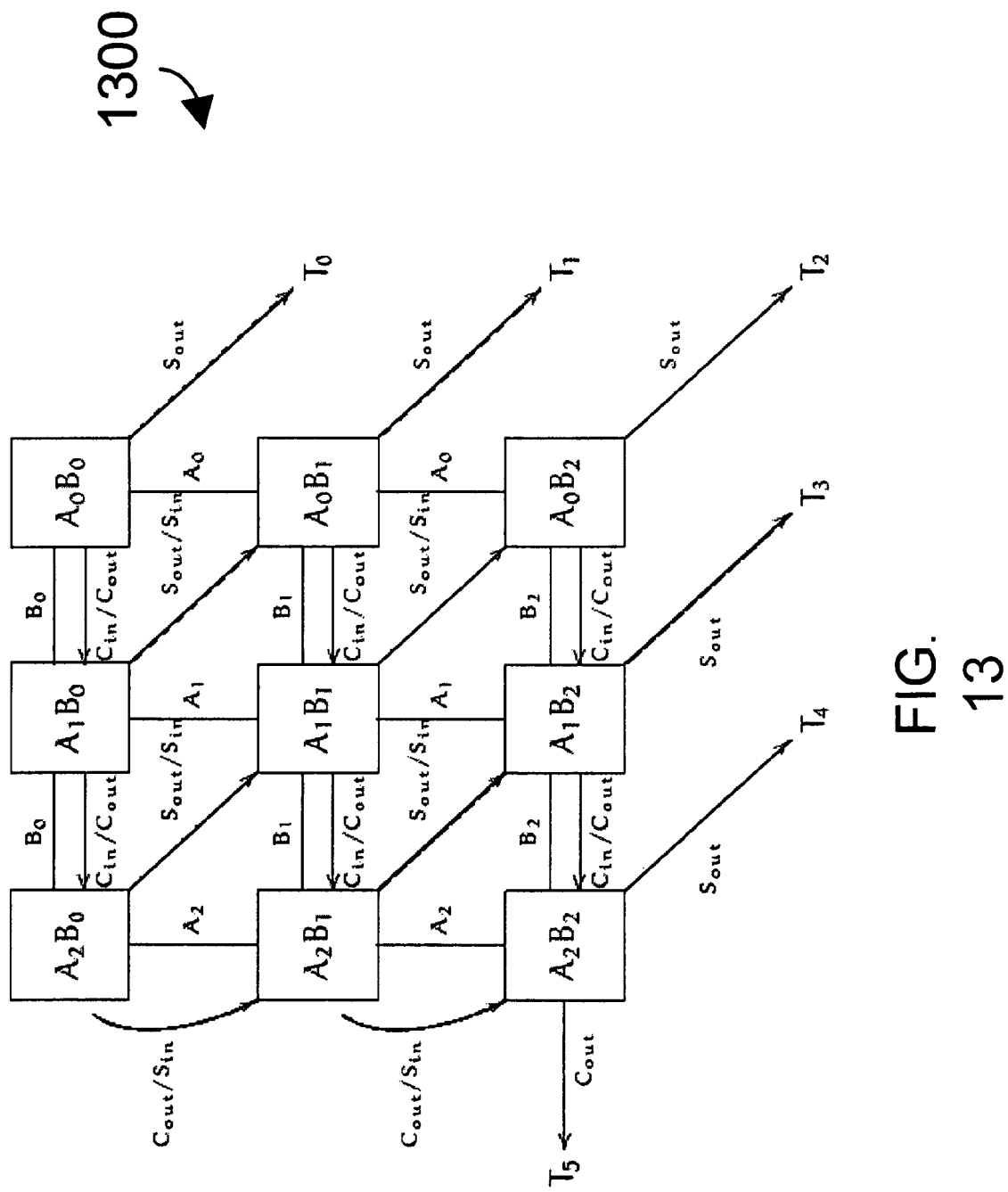
FIG. 13 is a schematic diagram of an embodiment of a multiplication circuit.

A multiplication circuit including bitwise multipliers is typically run in the normal way as to calculate the product of two numbers. However, it is possible using the present systems, methods and apparatus to run a multiplication circuit comprising qubits "backwards", starting from the product, in order to derive the multipliers. FIG. 13 shows a circuit 1300 of interconnected bitwise multipliers, each of which may, in some cases, be similar to the bitwise multiplier of FIG. 11. When connected as shown, circuit 1300 can perform a bitwise multiplication of two integers A and B whose binary representations are labeled $A_i$ and $B_j$, where i and j denote bit positions, with 0 being the lowest significant bit. The output of the product T, expressed in binary, is labeled $T_k$, where k denotes the bit position.

The bitwise multipliers of circuit 1300 may be composed of a plurality of qubits and couplings. When circuit 1300 is constructed from qubits instead of classical bits, the circuit can also be operated in such a way as to determine the multipliers of a product given the binary representation of the product, local bias values for one or more qubits, and one or more coupling values between qubits. For example, circuit 1300 may be embedded onto a set of quantum devices by using the embedding shown in FIG. 12 multiple times and coupling all the bitwise multipliers together as shown. That is, each bitwise multiplier of circuit 1300 may be embedded on a set of quantum devices like embedding 1200 or one of its variants. Then, coupling devices may be used to couple the bitwise multipliers together so that the total embedding behaves like circuit 1300.

Circuit 1300 can evolve from an initial state, where only the $T_k$ are known, to a final state where $A_i$ and $B_j$ are also known. In some cases, a positive local bias applied to a qubit in circuit 1300 corresponds to the bit value 1 and a negative local bias applied to a qubit corresponds to the bit value 0. In such cases, the appropriate local biases are applied to the qubits which represent the bits of product T. Ferromagnetic and anti-ferromagnetic couplings couple qubits together according to the setup of circuit 1300. An evolution of the circuit would then produce possible values for the factors A and B of the product. The answer may be checked to see if A and B are indeed factors of T.

Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other problem-solving systems devices, and methods, not necessarily the exemplary problem-solving systems devices, and methods generally described above.

For instance, the foregoing detailed description has set forth various embodiments of the systems, devices, and/or methods via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments.

All of the U.S. patents, U.S. patent application publications, U.S. patent applications, foreign patents, foreign patent applications and non-patent publications referred to in this specification including, but not limited to: U.S. Pat. No. 6,838,694; U.S. Patent Publication No. 2005-0082519; U.S. Patent Publication No. 2005-0256007; U.S. Patent Publication No. 2005-0250651; and U.S. Patent Publication No. 2005-0224784; U.S. Patent Application Ser. No. 60/698,362; U.S. patent application Ser. No. 11/100,931; and U.S. patent application Ser. No. 11/247,857; are incorporated herein by reference, in their entirety and for all purposes. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the invention to the specific embodiments disclosed in the specification and the claims, but should be construed to include all possible embodiments along with the full scope of equivalents to which such claims are entitled. Accordingly, the scope of the invention shall only be construed and defined by the scope of the appended claims.

We claim:

1. A method of factoring a number, the method comprising:
   creating a factor graph;
   mapping the factor graph onto an analog processor;
   initializing the analog processor to an initial state;
   evolving the analog processor from the initial state to a final state; and
   receiving an output from the analog processor, the output comprising a set of factors of the number.

2. The method of claim 1, further comprising:
   verifying that each factor in the set of factors is a true factor of the number.

3. The method of claim 1, further comprising:
   repeating at least one of the creating, mapping, initializing, evolving and receiving until a true set of factors of the number is obtained.

4. The method of claim 3, wherein evolving the analog processor from the initial state to a final state occurs a plurality of times via at least one of adiabatic evolution, quasi-adiabatic evolution, annealing by temperature, annealing by magnetic field, and annealing of barrier height.

5. The method of claim 1, wherein creating a factor graph includes:
   representing the number to be factored as a binary number;
   creating a set of factor bit length combinations;
   creating a set of factor equations for a first factor bit length combination; and
   creating the factor graph based on the set of factor equations.

6. The method of claim 5, further comprising:
   reducing the set of factor equations.

7. The method of claim 5, creating a set of factor bit length combinations includes determining a pair of bit lengths for each factor bit length combination in the set.

8. The method of claim 5, further comprising:
   ordering the set of factor bit length combinations based on a probability that a factor bit length combination corresponds to the set of factors of the number.

9. The method of claim 5, wherein the factor graph encodes the set of factor equations and initializing the analog processor to an initial state includes encoding the factor graph into the initial state.

10. The method of claim 5, wherein creating a set of factor equations includes generating a plurality of sets of factor equations and selecting a set of factor equations from the plurality of sets of factor equations.

11. The method of claim 10, wherein a set of factor equations in the plurality of sets of factor equations represents a multiplication of an n bit number and an m bit number and wherein the set of factor equations is selected based on an order of the sets of factor equations in the plurality of sets of factor equations, wherein the order is determined by a probability that the n bit number and the m bit number are factors of the number.

12. The method of claim 1, wherein creating a factor graph includes:
   creating a set of nonlinear equations, and wherein the factor graph is created based on the set of nonlinear equations.

13. The method of claim 1, wherein:
   creating a factor graph includes creating an energy function;
   mapping the factor graph onto the analog processor comprises mapping the energy function onto the analog processor; and
   the final state is a ground state of the energy function.

14. The method of claim 13, further comprising:
   reducing a degree of a term of the energy function.

15. The method of claim 1, wherein at least a portion of one of the creating, mapping, initializing, evolving and receiving is performed using a digital processor.

16. The method of claim 1, wherein the analog processor comprises a plurality of quantum devices spatially arranged in a two-dimensional grid, and a plurality of coupling devices between pairs of quantum devices and wherein mapping the factor graph includes assigning a node in the factor graph to a quantum device and assigning an edge in the factor graph to a coupling device.

17. A method of factoring a number, the method comprising:
   constructing a set of possible factor bit length combinations for the number;
   deriving a set of factor equations for each factor bit length combination;
   converting a selected set of factor equations into a factor graph;
   embedding the factor graph onto an analog processor;
   evolving the analog processor from an initial state to a final state;
   measuring the final state of the analog processor; and
   constructing a set of factors of the number based on the final state of the analog processor.

18. The method of claim 17, further comprising:
   reducing the selected set of factor equations.

19. The method of claim 17, wherein converting a selected set of factor equations into a factor graph includes constructing an energy function from the selected set of factor equations.

20. At least one computer-readable storage medium that stores computer executable instructions that when executed by at least one computer causes the at least one computer to factor a number, by:
  creating a factor graph;
  mapping the factor graph onto an analog processor;
  initializing the analog processor to an initial state;
  evolving the analog processor from the initial state to a final state; and
  receiving an output from the analog processor, the output comprising a set of factors of the number.

21. The computer-readable storage medium of claim 20, wherein initializing the analog processor to an initial state includes encoding the factor graph into the initial state.

22. The computer-readable storage medium of claim 20, wherein creating a factor graph includes:
  creating a set of possible combinations of factor lengths;
  creating a set of factor equations for a combination of factor lengths, wherein the set of factor equations corresponds to possible factors of the number; and
  creating a factor graph based on the set of factor equations.

23. The computer-readable storage medium of claim 22, wherein the instructions cause the at least one computer to factor a number further by:
  reducing the set of factor equations.

24. The computer-readable storage medium of claim 20, wherein the instructions cause the at least one computer to factor a number further by:
  verifying that each factor in the set of factors is a factor of the number.

25. A computer system for factoring a number, the computer system comprising:
  a central processing unit; and
  a memory, coupled to the central processing unit, the memory storing at least one program module, the at least one program module encoding:
    instructions for creating a factor graph;
    instructions for mapping the factor graph onto an analog processor;
    instructions for initializing the analog processor to an initial state;
    instructions for evolving the analog processor from the initial state to a final state; and
    instructions for receiving an output from the analog processor, the output comprising a set of factors of the number.

26. The computer system of claim 25, wherein the instructions for initializing include instructions for encoding the factor graph into the initial state.

27. The computer system of claim 25, wherein the instructions for creating a factor graph include:
  instructions for creating a set of possible combinations of factor lengths;
  instructions for creating a set of factor equations for a combination of factor lengths, wherein the set of factor equations corresponds to possible factors of the number; and
  instructions for creating a factor graph based on the set of factor equations.

28. The computer system of claim 27, wherein the at least one program module further encodes instructions for reducing the set of factor equations.

29. At least one computer-readable storage medium that stores computer executable instructions that when executed by at least one computer cause the at least one computer to factor a number, by:
  constructing a plurality of possible factor bit length combinations for the number;
  deriving a set of factor equations for each factor bit length combination;
  converting a selected set of factor equations into a factor graph;
  embedding the factor graph as input to an analog processor;
  evolving the analog processor from an initial state to a final state;
  receiving the final state of the analog processor; and
  constructing a set of factors of the number based on the final state of the analog processor.

30. The computer-readable storage medium of claim 29, wherein converting a selected set of factor equations into a factor graph includes reducing the selected set of factor equations.

31. The computer-readable storage medium of claim 29, wherein converting a selected set of factor equations into a factor graph includes constructing an energy function from the selected set of factor equations.

32. A system for factoring a number, the system comprising:
  an analog processor;
  a graph module for creating a factor graph;
  a mapper module for mapping the factor graph onto the analog processor;
  an initialization module for initializing the analog processor to an initial state;
  an evolution module for evolving the analog processor from the initial state to a final state; and
  a receiver module for receiving an output from the analog processor, the output comprising a set of factors of the number.

33. The system of claim 32, wherein:
  the analog processor includes a plurality of quantum devices spatially arranged in a two-dimensional grid and a plurality of coupling devices, each coupling device in the plurality of coupling devices coupling a pair of quantum devices;
  the initialization module includes a quantum device control system configured to set an initial state of at least one of the quantum devices in accordance with the factor graph and a coupling device control system configured to set an initial state of at least one coupling device in accordance with the factor graph;
  the receiver module comprises a readout device configured to read out the final state of at least one of the quantum devices.

34. The system of claim 32, further comprising:
  a digital processor in communication with at least one of the graph module, the mapper module, the initialization module, the evolution module and the receiver module.

35. A graphical user interface for depicting a set of factors of a number, the graphical user interface comprising a first display field for displaying the set of factors, the set of factors obtained by a method comprising:
  creating a factor graph;
  mapping the factor graph onto an analog processor;
  initializing the analog processor to an initial state;
  evolving the analog processor from the initial state to a final state; and
  receiving an output from the analog processor, the output comprising the set of factors.

36. The graphical user interface of claim 35, further comprising:
   a second display field for displaying the factor graph.

37. A method, comprising:
   converting a factoring problem into an optimization problem;
   mapping the optimization problem onto an analog processor;
   initializing the analog processor to an initial state;
   evolving the analog processor from the initial state to a final state, the final state representing a solution to the optimization problem; and
   determining a solution to the factoring problem from the solution to the optimization problem.

* * * * *